United States Patent
Kondo et al.

(10) Patent No.: US 8,363,071 B2
(45) Date of Patent: Jan. 29, 2013

(54) IMAGE PROCESSING DEVICE, IMAGE PROCESSING METHOD, AND PROGRAM

(75) Inventors: Tetsujiro Kondo, Minato-Ku (JP); Sakon Yamamoto, Minato-Ku (JP)

(73) Assignee: Sony Corporation, Tokyo (JP)

( * ) Notice: Subject to any disclaimer, the term of this patent is extended or adjusted under 35 U.S.C. 154(b) by 850 days.

(21) Appl. No.: 12/518,649

(22) PCT Filed: Dec. 18, 2007

(86) PCT No.: PCT/JP2007/074261
§ 371 (c)(1),
(2), (4) Date: Jun. 11, 2009

(87) PCT Pub. No.: WO2008/075659
PCT Pub. Date: Jun. 26, 2008

(65) Prior Publication Data
US 2010/0013873 A1 Jan. 21, 2010

(30) Foreign Application Priority Data

Dec. 18, 2006 (JP) ................. 2006-340080
Feb. 23, 2007 (JP) ................. 2007-043161
Aug. 28, 2007 (JP) ................. 2007-221274

(51) Int. Cl.
*G09G 5/10* (2006.01)
(52) U.S. Cl. ............ 345/691; 345/690; 345/89; 345/77; 345/63; 348/383; 348/602
(58) Field of Classification Search ............... 345/691, 345/591, 204, 690, 89, 77, 63; 348/383, 348/602; 358/520; 250/221
See application file for complete search history.

(56) References Cited

U.S. PATENT DOCUMENTS
6,310,588 B1 10/2001 Kawahara et al.
(Continued)

FOREIGN PATENT DOCUMENTS
JP 8-76741 3/1996
JP 11-38944 2/1999
(Continued)

OTHER PUBLICATIONS

Toda, K. et al., "Color Disturbance and Dynamic False Contour Observed in Moving Images of PDP", The Institute of Electronics, Information and Communication Engineers, vol. 95, No. 526, pp. 67-72 (1996) (with English Translation).

(Continued)

*Primary Examiner* — Lun-Yi Lao
*Assistant Examiner* — Shaheda Abdin
(74) *Attorney, Agent, or Firm* — Oblon, Spivak, McClelland, Maier & Neustadt, L.L.P.

(57) ABSTRACT

The present invention relates to an image processing device that can reproduce a state in which, using a first display device, an image is displayed on a second display device having a characteristic different from that of the first display device, an image processing method, and a program. A motion detecting unit 100 detects motion of an image from an input image signal. A sub-field developing unit 200 develops the input image signal over sub-fields. A light-intensity integrating unit 300 calculates, in a simulated manner, the light intensity integrated on the retinas of a person at the time the person sees the input image signal, from the direction of the motion of the image and a light emitting pattern of the sub-fields, and displays the image with the calculated light intensity on the first display device. The present invention is applicable to the case where, for example, using an LCD, a state in which an image is displayed on a PDP having a characteristic different from that of the LCD is reproduced.

15 Claims, 28 Drawing Sheets

U.S. PATENT DOCUMENTS

| | | | |
|---|---|---|---|
| 6,989,845 B1 | 1/2006 | Okamoto et al. | |
| 2002/0140626 A1* | 10/2002 | Chang | 345/1.1 |
| 2005/0206789 A1* | 9/2005 | Takase | 348/602 |

FOREIGN PATENT DOCUMENTS

| | | |
|---|---|---|
| JP | 11-212517 | 8/1999 |
| JP | 11 231827 | 8/1999 |
| JP | 2000-250439 A | 9/2000 |
| JP | 2000-310987 | 11/2000 |
| JP | 2001 83926 | 3/2001 |
| JP | 2001-296831 A | 10/2001 |
| JP | 2001-306018 A | 11/2001 |
| JP | 2002-199248 A | 7/2002 |
| JP | 2002-232921 | 8/2002 |
| JP | 2007-110327 A | 4/2007 |

OTHER PUBLICATIONS

Y. Zhang, et al., "31.5: Characterizing Motion Artifacts and Flicker of PDP's", SID 06 Digest, vol. XXXVII, XP 007012726, May 24, 2005, pp. 1328-1331.

Sang-Jun Ahn, et al., "Detection and Compensation of Dynamic False Contours in PDP", IDW '03, PDPp1-7, XP 007016234, Jan. 1, 2001, pp. 929-932.

Office Action issued Dec. 13, 2011, in European Patent Application No. 07850750.6.

Taiichiro Kurita, "17.1: Invited Paper: Desirable Performance and Progress of PDP and LCD Television Displays on Image Quality", SID Digest, International Symposium, vol. XXXIV, XP 7008238, May 20, 2003, pp. 776-779.

Muge Wang, et al., "Prediction of the texture visibility of color halftone patterns", Journal of Electronic Imaging, vol. 11, No. 2, XP 1115912, Apr. 2002, pp. 195-205.

Japanese Office Action issued Apr. 10, 2012, in Patent Application No. 2007-221274.

Japanese Office Action issued Apr. 12, 2012, in Patent Application No. 2007-043160 (with English-language translation).

Decision to Refuse a European Patent Application issued May 7, 2012, in Patent Application No. 07 850 750.6.

Office Action issued May 24, 2012, in Japanese Patent Application No. 2007-261601.

Office Action issued Jun. 21, 2012, in Japanese Patent Application No. 2007-043160 (with English-language translation).

Japanese Office Action issued Jul. 17, 2012, in Patent Application No. 2007-288456.

* cited by examiner

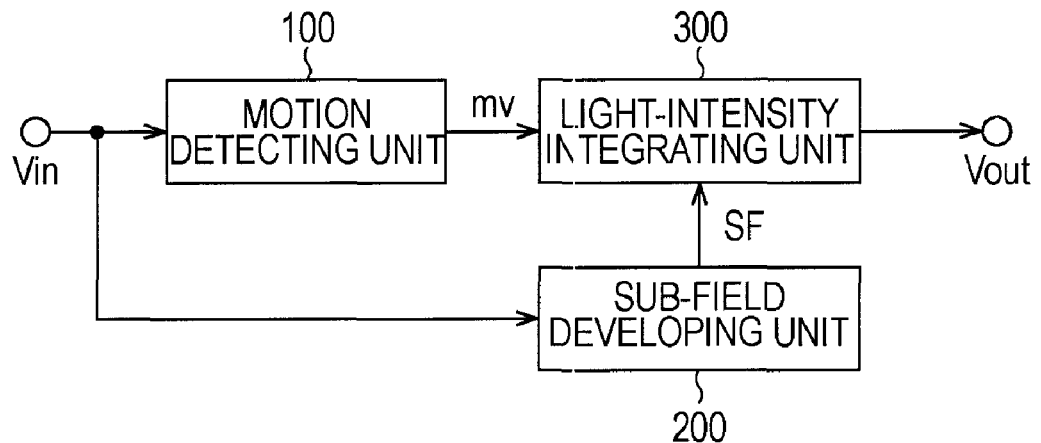
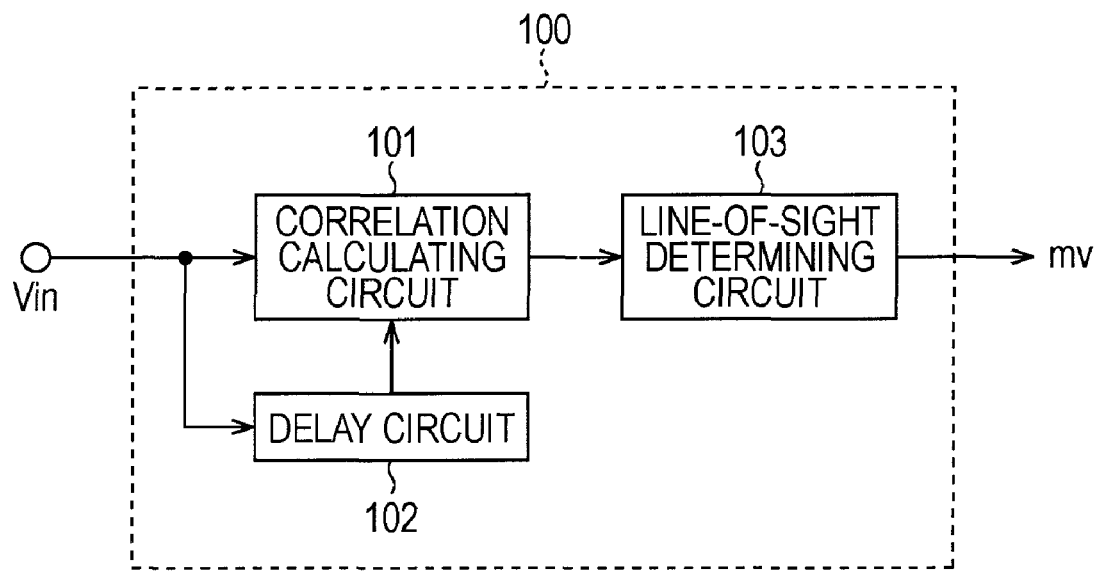

FIG. 17
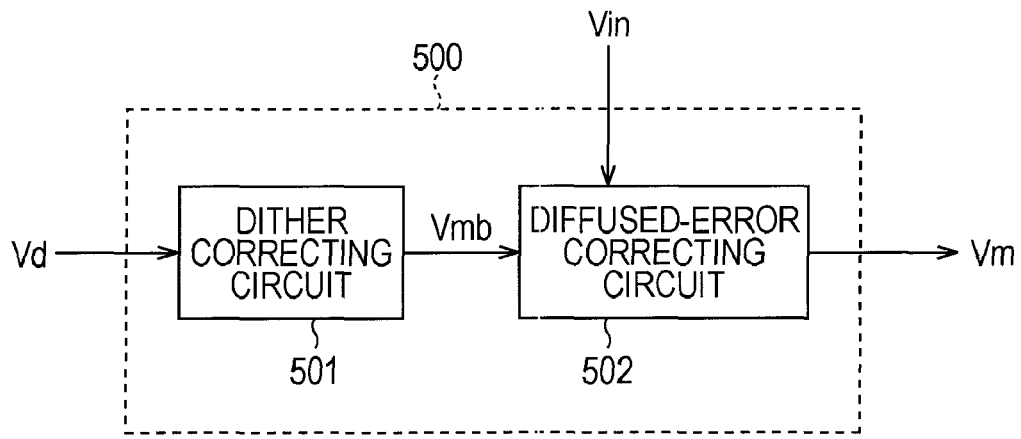
FIG. 18
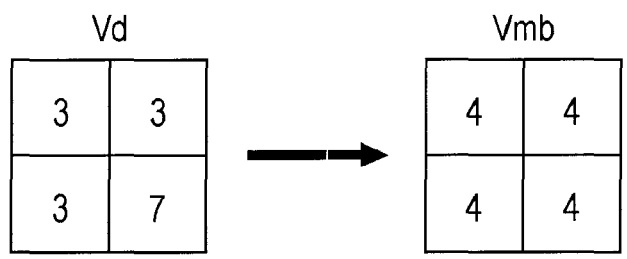
FIG. 19
| Vin | 100 | 105 | 90 | ... |
| Vmb | 90 | 110 | 80 | ... |
| Vm | 95 | 100 | 90 | ... |
SEQUENCE OF DIFFUSED ERRORS

FIG. 37

LIGHT-INTENSITY-INTEGRATED-VALUE TABLE

| SUB-FIELD / RELATIVE POSITION | SF1 | SF2 | ... | SF8 |
|---|---|---|---|---|
| [-8,-8] | $R_{SF1}[-8,-8]$ | $R_{SF2}[-8,-8]$ | ... | $R_{SF8}[-8,-8]$ |
| [-8,-7] | $R_{SF1}[-8,-7]$ | $R_{SF2}[-8,-7]$ | ... | $R_{SF8}[-8,-7]$ |
| ... | ... | ... | ... | ... |
| [0,-1] | $R_{SF1}[0,-1]$ | $R_{SF2}[0,-1]$ | ... | $R_{SF8}[0,-1]$ |
| [0,0] | $R_{SF1}[0,0]$ | $R_{SF2}[0,0]$ | ... | $R_{SF8}[0,0]$ |
| [0,1] | $R_{SF1}[0,1]$ | $R_{SF2}[0,1]$ | ... | $R_{SF8}[0,1]$ |
| ... | ... | ... | ... | ... |
| [7,6] | $R_{SF1}[7,6]$ | $R_{SF2}[7,6]$ | ... | $R_{SF8}[7,6]$ |
| [7,7] | $R_{SF1}[7,7]$ | $R_{SF2}[7,7]$ | ... | $R_{SF8}[7,7]$ |

IMAGE PROCESSING DEVICE, IMAGE PROCESSING METHOD, AND PROGRAM

TECHNICAL FIELD

The present invention relates to image processing devices, image processing methods, and programs, and more particularly, to an image processing device that can make it possible to reproduce a state in which, using a first display device that displays an image, such as an LCD (Liquid Crystal Display), the image is displayed on a second display device that has characteristics different from those of the first display device, such as a PDP (Plasma Display Panel), an image processing method, and a program.

BACKGROUND ART

As display devices that display image signals, there exist various display devices, such as a CRT (Cathode Ray Tube), an LCD, a PDP, an organic EL (Electroluminescence), and a projector.

For example, regarding a PDP, a method of suppressing the generation of a false contour by calculating the intensity of light entering each retina position at the time the line of sight follows a moving pixel on a display screen and, from output data thereof, generating new sub-field data has been proposed (for example, see Patent Document 1).

Patent Document 1: Japanese Unexamined Patent Application Publication No. 2000-39864

DISCLOSURE OF INVENTION

Technical Problem

Now, display characteristics are different from display device to display device. Thus, differences in characteristics (display characteristics) among display devices become a significant problem in monitoring performed to check whether an image signal is in an appropriate viewing state (display state). That is, even when a certain image signal is displayed on an LCD and monitored, it is difficult to check how this image signal would look when this image signal is displayed on a PDP.

Therefore, when monitoring is to be performed taking into consideration the characteristics of a plurality of display devices, it is necessary to prepare display devices as many as needed, resulting in an increase in dimensions of a monitoring system.

Also, a PDP is a display device that constitutes one field of an input image signal by a plurality of sub-fields, and realizes multi-gradation-level display by controlling each sub-field to emit or not to emit light.

Therefore, there is a characteristic that, at the time of displaying a moving image, when the line of sight of a person follows a moving object or the like within the image, the displayed image and the image seen by the eyes of the person may be different depending on a light emitting pattern of the sub-fields. However, in order to check how a moving image would actually look on a PDP, it is necessary to display the moving image on the PDP and have a person see and check the displayed moving image. This checking operation is bothersome, and furthermore, an objective evaluation is difficult to do.

The present invention has been made in view of these circumstances and makes it possible to reproduce a state in which, using a first display device such as an LCD, an image is displayed on a second display device, such as a PDP, which has characteristics different from those of the first display device.

Technical Solution

An aspect of the present invention resides in an image processing device that reproduces a state in which, using a first display device that displays an image, the image is displayed on a second display device having a characteristic different from that of the first display device, or a program that causes a computer to function as the image processing device. The image processing device includes motion detecting means for detecting motion of an image from an input image signal; sub-field developing means for developing the input image signal over a plurality of sub-fields; and light-intensity integrating means for calculating, in a simulated manner, a light intensity integrated on retinas of a person at the time the person sees the input image signal displayed on the second display device, from a direction of the motion detected by the motion detecting means and a light emitting pattern of the sub-fields developed by the sub-field developing means, and generating an output image signal whose pixel value is the light intensity.

Also, the aspect of the present invention resides in an image processing method of reproducing a state in which, using a first display device that displays an image, the image is displayed on a second display device having a characteristic different from that of the first display device. The image processing method includes the steps of detecting motion of an image from an input image signal; developing the input image signal over a plurality of sub-fields; and calculating, in a simulated manner, a light intensity integrated on retinas of a person at the time the person sees the input image signal displayed on the second display device, from a direction of the motion of the image and a light emitting pattern of the sub-fields, and generating an output image signal whose pixel value is the light intensity.

According to the foregoing aspect, the motion of an image is detected from an input image signal, and the input image signal is developed over a plurality of sub-fields. The light intensity integrated on retinas of a person at the time the person sees the input image signal displayed on the second display device is calculated, in a simulated manner, from a direction of the motion of the image and a light emitting pattern of the sub-fields, and an output image signal whose pixel value is the light intensity is generated.

Advantageous Effects

According to the aspect of the present invention, a state in which, using a first display device such as an LCD, an image is displayed on a second display device, such as a PDP, which has characteristics different from those of the first display device can be reproduced.

BRIEF DESCRIPTION OF DRAWINGS

FIG. 1 is a block diagram illustrating a structure example of a first embodiment of an image processing device to which the present invention is applied.

FIG. 2 is a block diagram illustrating a structure example of a motion detecting unit 100.

FIG. 17 is a block diagram illustrating a structure example of a vision correcting unit 500.

FIG. 18 is a diagram describing an operation of a dither correcting circuit 501.

FIG. 19 is a diagram describing an operation of a diffused-error correcting circuit 502.

FIG. 37 is a diagram illustrating a light-intensity-integrated-value table.

Figure 3:
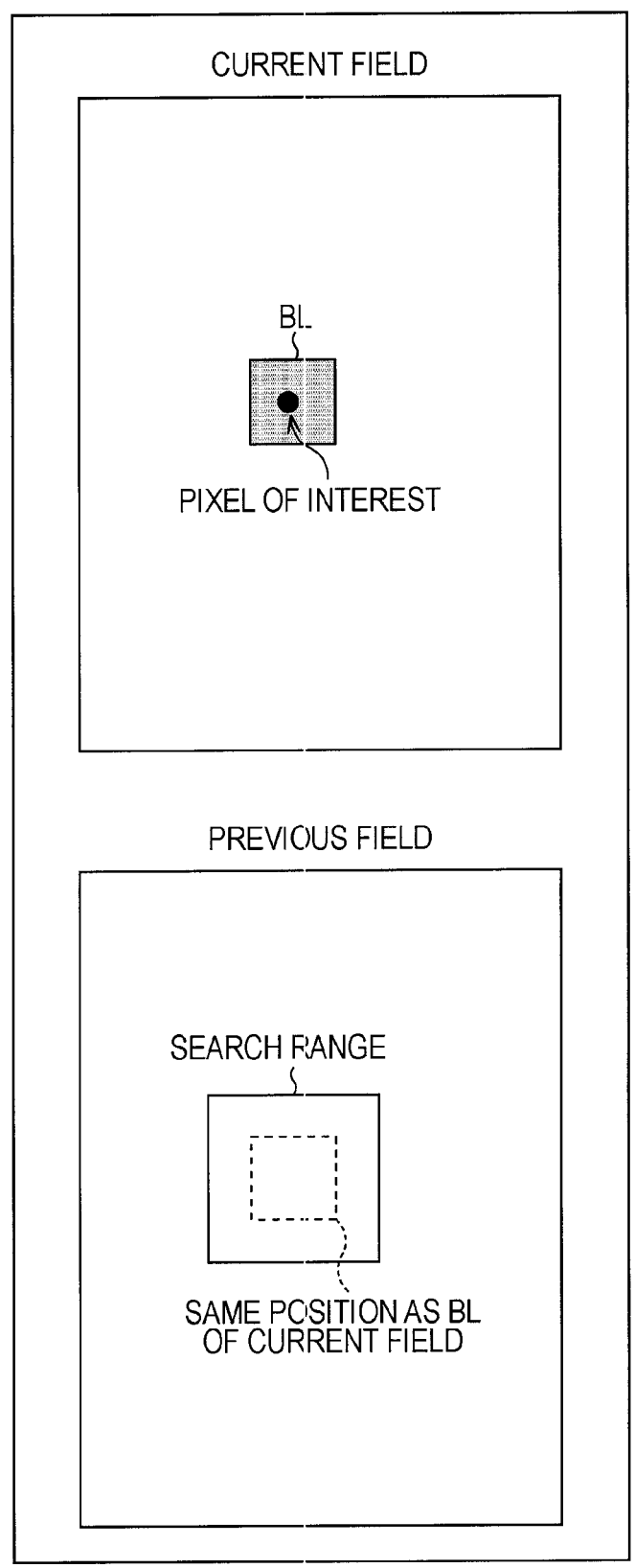
FIG. 3 is a diagram describing motion detection.

EXPLANATION OF REFERENCE NUMERALS 100 motion detecting unit, 101 correlation calculating circuit, 102 delay circuit, 103 line-of-sight determining circuit, 200 sub-field developing unit, 201 sub-field assigning circuit, 202 light-emission determining circuit, 300 light-intensity integrating unit, 301 light-intensity-integrating-region determining circuit, 302 light-intensity integrating circuit, 303 light-intensity-integrated-value-table storage unit, 304 light-intensity-integrating-region selecting circuit, 400 gradation-level converting unit, 401 delay circuit, 402 gradation-level converting circuit, 403 gradation-level converting table, 404 dither converting circuit, 405, 406 computing units, 500 vision correcting unit, 501 dither correcting circuit, 502 diffused-error correcting circuit, 1101 bus, 1102 CPU, 1103 ROM, 1104 RAM, hard disk, 1106 output unit, 1107 input unit, 1108 communication unit, 1109 drive, 1110 input/output interface, removable recording medium

BEST MODE FOR CARRYING OUT THE INVENTION

Embodiments of the present invention will now be described below with reference to the drawings.

FIG. 1 illustrates a structure example of a first embodiment of an image processing device to which the present invention is applied.

An input image signal Vin is supplied to a motion detecting unit 100 and a sub-field developing unit 200.

FIG. 2 illustrates the structure of the motion detecting unit 100 in FIG. 1. The motion detecting unit 100 detects, from the input image signal Vin, a motion vector of each pixel as the line of sight of a person on a pixel-by-pixel basis at the time the person sees the input image signal Vin.

The input image signal Vin is supplied to a correlation calculating circuit 101 and a delay circuit 102. The correlation calculating circuit 101 performs a correlation calculation between the input image signal Vin of the current field and an input image signal of a previous field, which is obtained by delaying the current field by one field using the delay circuit 102.

A correlation calculating operation is illustrated in FIG. 3.

The correlation calculating circuit 101 sets, for a pixel of interest in the current field, a block BL having the pixel of interest as the center. The block BL is, for example, a 5×5-pixel block. The correlation calculating circuit 101 sets, in a previous field obtained by delaying the current field using the delay circuit 102, a search range having the same position as the block BL in the current field as the center. The search range is, for example, a region having −8 to +7 pixels in the horizontal and vertical directions, with reference to the same position as the block BL in the current field. The correlation calculating circuit 101 performs, as a correlation calculation, a calculation of obtaining, as an evaluation value for evaluating the correlation between the block BL and each candidate block that has the same size as the block BL and is within the search range, the sum total of, for example, the absolute values of differences between pixel values of the current block BL and each candidate block, and supplies the calculation result obtained with each candidate block to a line-of-sight determining circuit 103.

Figure 4:
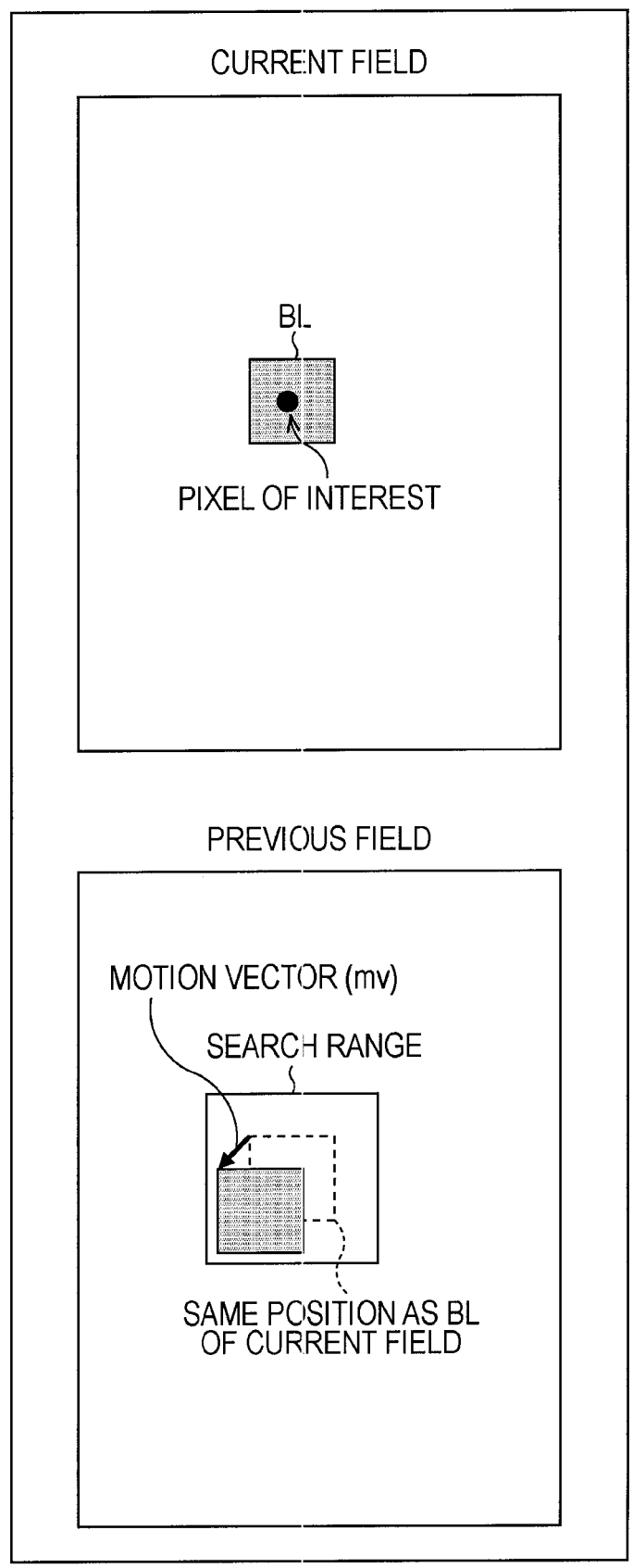
FIG. 4 is a diagram describing motion detection.

Referring back to FIG. 2, the line-of-sight determining circuit 103 detects the position of a candidate block with which the calculation result having the minimum value is obtained, among the calculation results supplied from the correlation calculating circuit 101, as a motion vector of the pixel of interest. Here, the position of the candidate block is, as illustrated in FIG. 4, a relative position from the block BL. The line-of-sight determining circuit 103 determines the direction of the motion vector of the pixel of interest as the line-of-sight direction at the time a person sees the pixel of interest, that is, the direction in which the line of sight of a person who sees the current field follows a target (line-of-sight direction) mv.

The correlation calculating circuit 101 sets the block BL for each pixel of interest. Alternatively, the correlation calculating circuit 101 may divide the current field into blocks having 5×5 pixels, obtain the line-of-sight direction (motion vector) for each block, and apply the same line-of-sight direction to all pixels in the block. In a correlation calculation with each candidate block within the search range, an evaluation value may be obtained by adding a certain weight to the absolute value of the difference of a pixel near the pixel of interest. In this case, a correlation of a pixel near the pixel of interest is heavily weighted.

Figure 5:
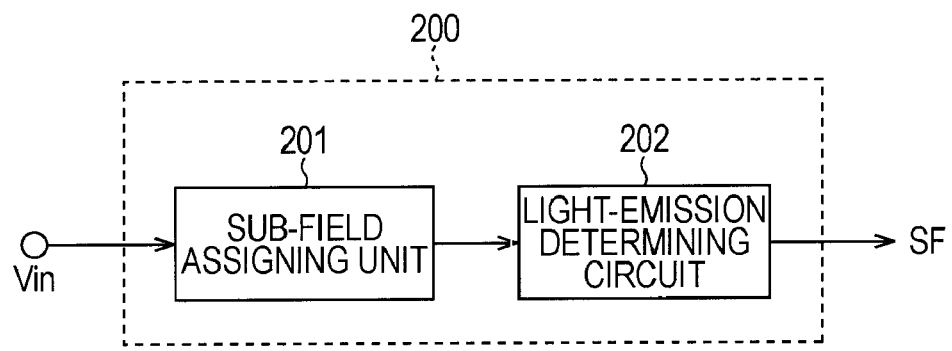
FIG. 5 is a block diagram illustrating a structure example of a sub-field developing unit 200.

FIG. 5 illustrates a structure example of the sub-field developing unit 200 in FIG. 1.

The sub-field developing unit 200 generates a light emitting pattern of the individual sub-fields at the time of displaying the input image signal Vin on a PDP.

Before an operation of the sub-field developing unit 200 is described, a multi-gradation-level display method of a PDP will be described. A PDP divides one field into a plurality of sub-fields and changes only the weight of luminance of light emitted in each sub-field, thereby performing multi-gradation-level display.

Figure 6:
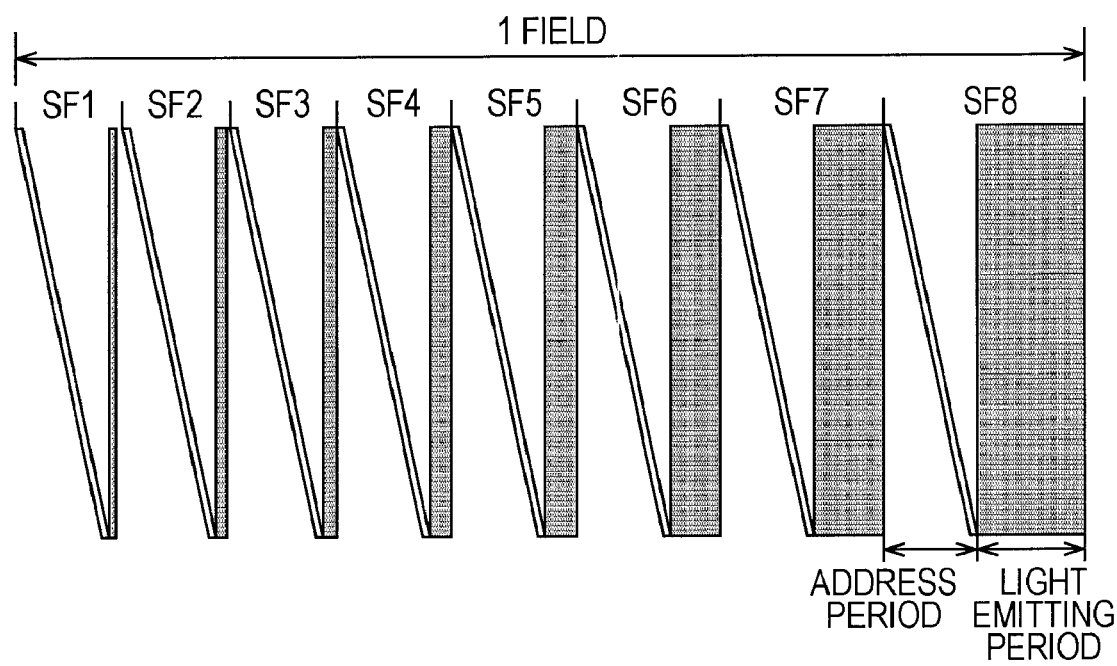
FIG. 6 is a diagram illustrating a structure example of sub-fields.

A structure example of sub-fields in a PDP is illustrated in FIG. 6. In FIG. 6, one field is divided into eight sub-fields SF1, SF2, SF3, SF4, SF5, SF6, SF7, and SF8, and the individual sub-fields SF1 to SF8 have different weights of luminance (light intensities).

Each of the sub-fields SF1 to SF8 includes an address period in which pixels therein are set to emit or not to emit light, and a light emitting period in which the pixels set to emit light in the address period emit light.

When the weights of luminance of the individual sub-fields SF1 to SF8 are, for example, 1, 2, 4, 8, 16, 32, 64, and 128, 256 gradation levels from 0 to 256 can be realized by combining these sub-fields SF1 to SF8.

Figure 7:
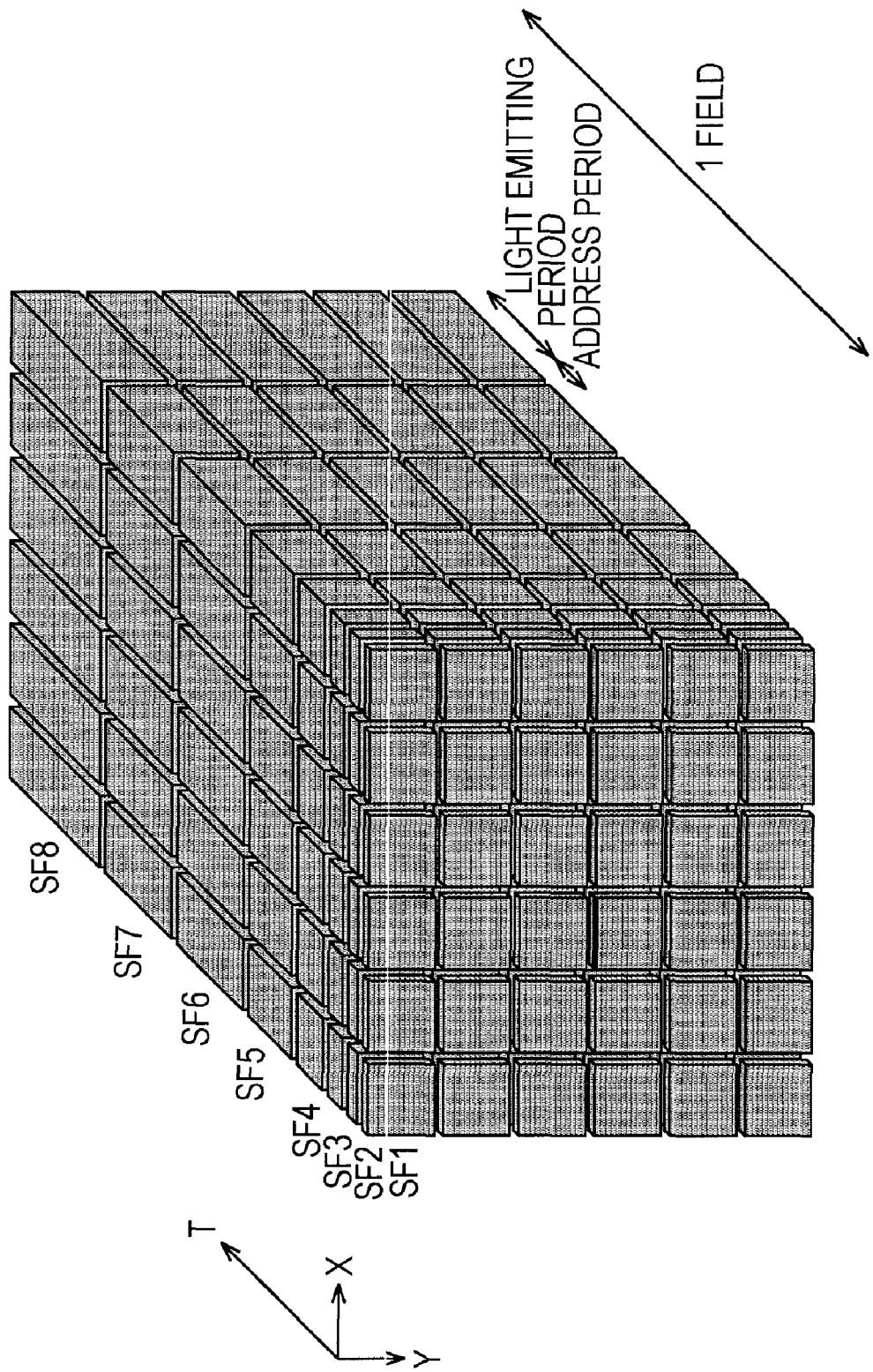
FIG. 7 is a diagram illustrating a structure example of sub-fields.

Since the actual PDP is configured on a two-dimensional plane, an image displayed on the PDP is represented by, as illustrated in FIG. 7, a three-dimensional model diagram including sub-fields having pixel positions X, Y in the PDP and being in a time direction T.

Referring back to FIG. 5, the input image signal Vin is supplied to a sub-field assigning circuit 201. The sub-field assigning circuit 201 expresses a pixel value in one field of the input image signal Vin using the following equation (1). Note that $N_i$ is light emitting information indicating no light emission or light emission in a sub-field SF#i and is 0 or 1.

$$1 \times N_1 + 2 \times N_2 + 4 \times N_3 + 8 \times N_4 + 16 \times N_5 + 32 \times N_6 + 64 \times N_7 + 128 \times N_8 \quad (1)$$

Note that, here, as in the case of the sub-field structure of the PDP to be displayed, which is illustrated in FIG. 6, one field is constituted by eight sub-fields SF1 to SF8, and weights of luminance of the individual sub-fields SF1 to SF8 are 1, 2, 4, 8, 16, 32, 64, and 128, respectively. Also, the following description is based on this structure.

The sub-field assigning circuit 201 supplies the value of light emitting information $N_i$ of each pixel to a light-emission determining circuit 202. The light-emission determining circuit 202 generates, on the basis of $N_i$, which indicates light emission when $N_i$ is 1 and no light emission when $N_i$ is 0, light-emission control information SF indicating a light emitting pattern of the sub-fields.

For example, when a certain pixel value in the input image signal Vin is "7", light-emission control information SF that assigns light emission to the sub-fields SF1, SF2, and SF3 and no light emission to the other sub-fields is generated. Also, for example, when a certain pixel value in the input image signal Vin is "22", light-emission control information SF that assigns light emission to the sub-fields SF2, SF3, and SF5 and no light emission to the other sub-fields is generated.

Figure 8:
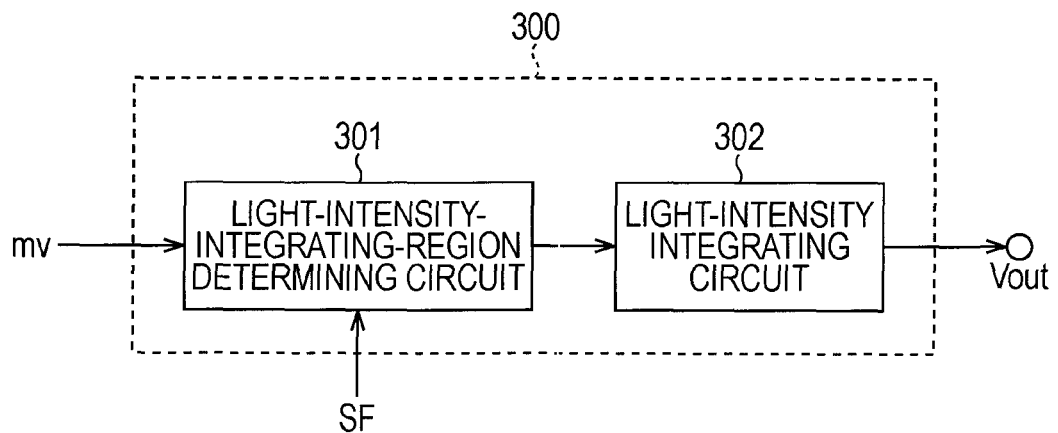
FIG. 8 is a block diagram illustrating a structure example of a light-intensity integrating unit 300.

FIG. 8 illustrates the structure of the light-intensity integrating unit 300 in FIG. 1. The light-intensity integrating unit 300 generates an image having, as a pixel value, the light intensity integrated on the retinas of a person at the time the input image signal Vin is displayed on the PDP as a so-called simulated image seen by the eyes of the person when the input image signal is displayed on the PDP.

Before an operation of the light-intensity integrating unit 300 is described, how an image would look depending on the line-of-sight direction and the light emitting pattern, which are unique to the PDP, will be described.

Figure 9:
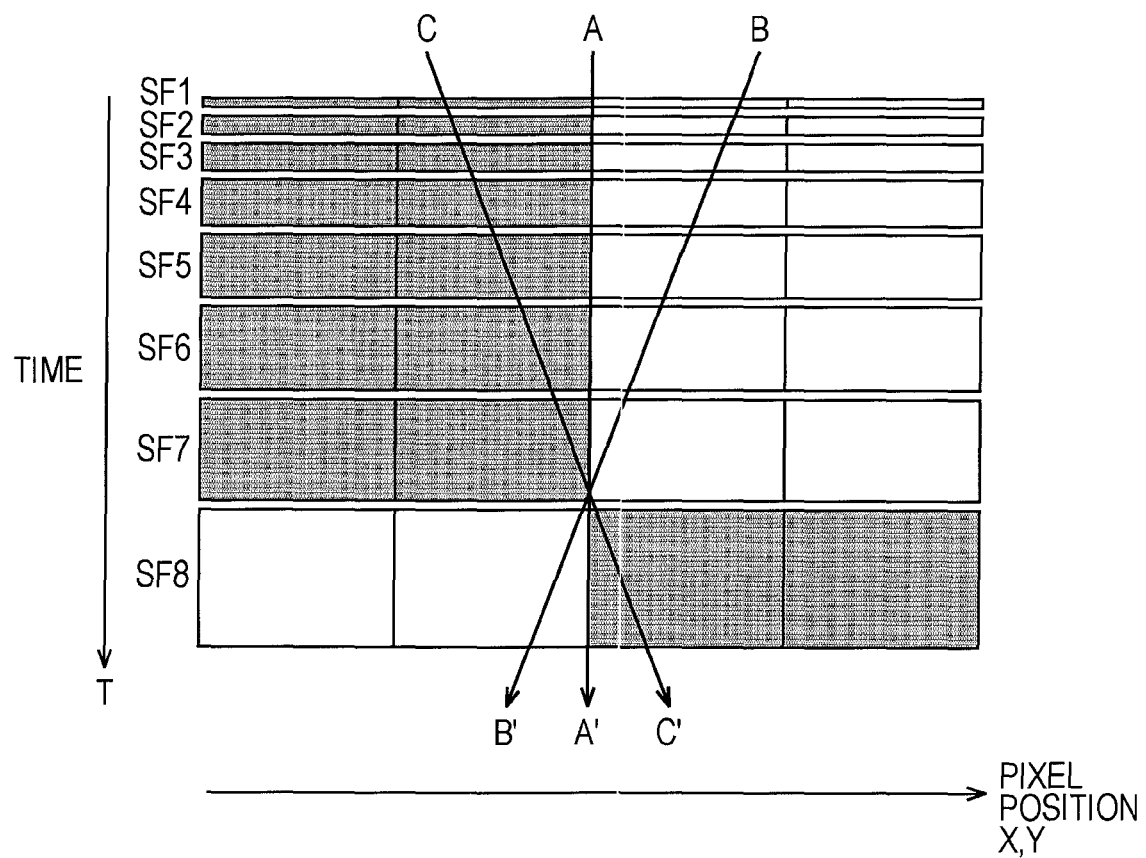
FIG. 9 is a diagram describing generation of a false contour.

FIG. 9 illustrates a boundary between pixel values 127 and 128 in the sub-fields in which the pixel position X (Y) is plotted in abscissa and time T is plotted in ordinate. Shaded sub-fields represent sub-fields that emit light.

When an image is not moving, the line-of-sight direction of a person becomes the direction A-A' parallel to the time direction T in ordinate, and light emission in the sub-fields is correctly integrated on the retinas of the person. Thus, the pixels 127 and 128 are correctly recognized.

However, when an image moves one pixel to the left per field, the eyes of a person (the line of sight) follow the movement. Thus, the line-of-sight direction becomes the direction B-B', which is not parallel to the time direction T in ordinate. This causes light emission in the sub-fields not to be integrated on the retinas of the person and leaves a black line between the pixel values 127 and 128. In contrast, when an image moves one pixel to the right per field, the eyes of the person (the line of sight) follow the movement. Thus, the line-of-sight direction becomes the direction C-C', which is not parallel to the time direction T in ordinate. This causes light emission in the sub-fields to be excessively integrated on the retinas of the person and leaves a white line between the pixel values 127 and 128.

As above, since the PDP uses a driving scheme that uses sub-fields, the phenomenon in which a displayed image and an image seen by the eyes of a person are different occurs depending on the line-of-sight direction and the light emitting pattern, which is generally known as a moving-image false contour.

Referring back to FIG. 8, the line-of-sight direction mv at each pixel, which is detected by the motion detecting unit 100, and the light-emission control information SF generated by the sub-field developing unit 200 are supplied to a light-intensity-integrating-region determining circuit 301.

Figure 10:
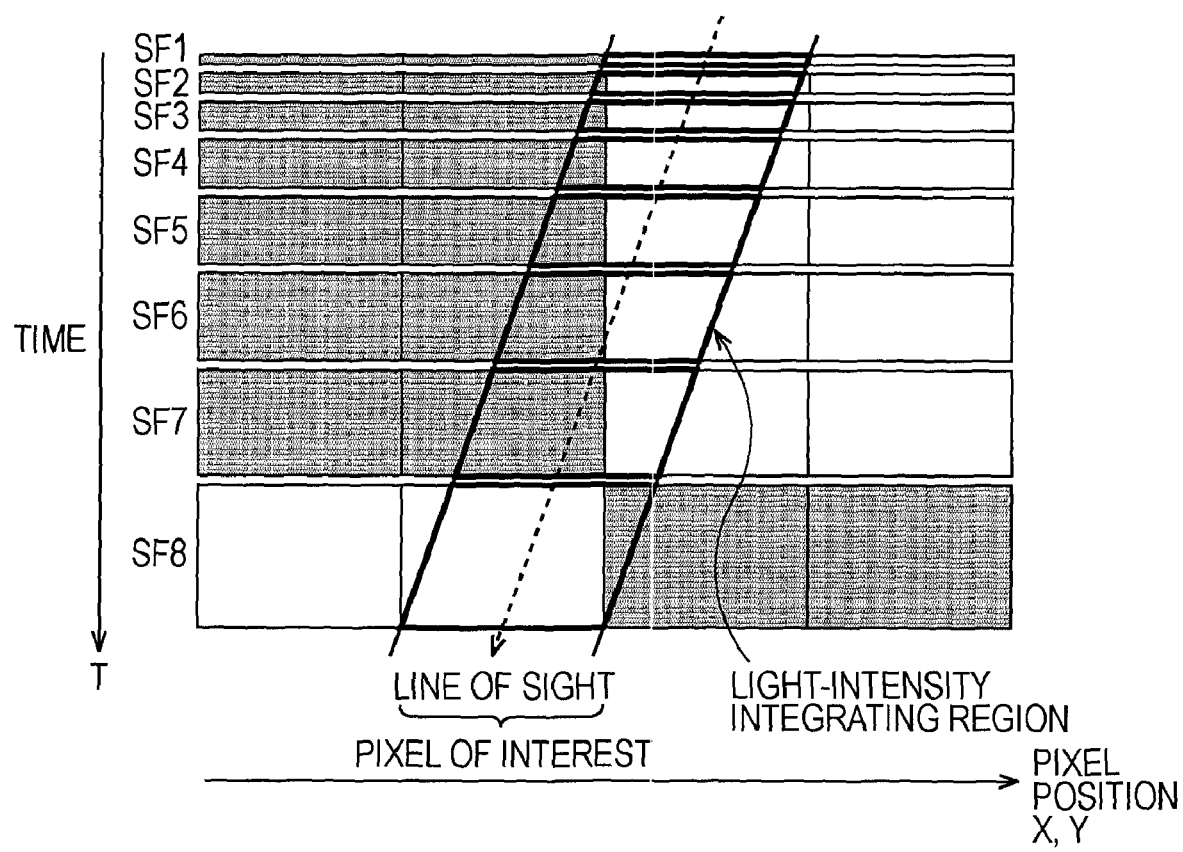
FIG. 10 is a diagram illustrating a light-intensity integrating region.

The light-intensity-integrating-region determining circuit 301 determines, for each pixel, a light-intensity integrating region for reproducing, in a simulated manner, the light intensity integrated on the retinas of a person at the time of displaying the input image signal Vin on the PDP, from the line-of-sight direction mv detected by the motion detecting unit 100 and the light-emission control information SF, which is generated by the sub-field developing unit 200 and indicates the light emitting pattern of the sub-fields. That is, as illustrated in FIG. 10, for a pixel of interest, a light-intensity integrating region having a cross section area equivalent to one pixel in the detected line-of-sight direction is set.

Furthermore, the light-intensity-integrating-region determining circuit 301 integrates the light intensity in each sub-field SF#i in accordance with the ratio of light-emission regions to no-light-emission regions in each sub-field within the light-intensity integrating region. For example, in the case of FIG. 10, when the ratio of light-emission regions to no-light-emission regions in the sub-field SF8 is 7:1, the light intensity integrated in the sub-field SF8 is 128×1/(7+1)=16. The light-intensity-integrating-region determining circuit 301 similarly calculates the light intensities integrated in all the sub-fields SF1 to SF8 and supplies the light intensities to a light-intensity integrating circuit 302.

The light-intensity integrating circuit 302 obtains the sum total of the light intensities in the sub-fields SF1 to SF8, which are from the light-intensity-integrating-region determining circuit 301, and regards the sum total as a pixel value of the pixel of interest. The light-intensity integrating circuit 302 performs similar processing for all pixels, thereby generating an output image Vout.

Also, the processing performed by the light-intensity-integrating-region determining circuit 301 and the light-intensity integrating circuit 302 can be simplified as follows.

That is, in FIG. 10, in the ratio of light-emission regions to no-light-emission regions in each sub-field, the greater quantity is selected. In this case, the sub-field SF8 does not emit light, and the light intensity is zero. The sub-field SF7 emits light, and the light intensity is 64. The sum total of results in all the sub-fields, which are similarly obtained, becomes a pixel value of the pixel of interest.

Figure 11:
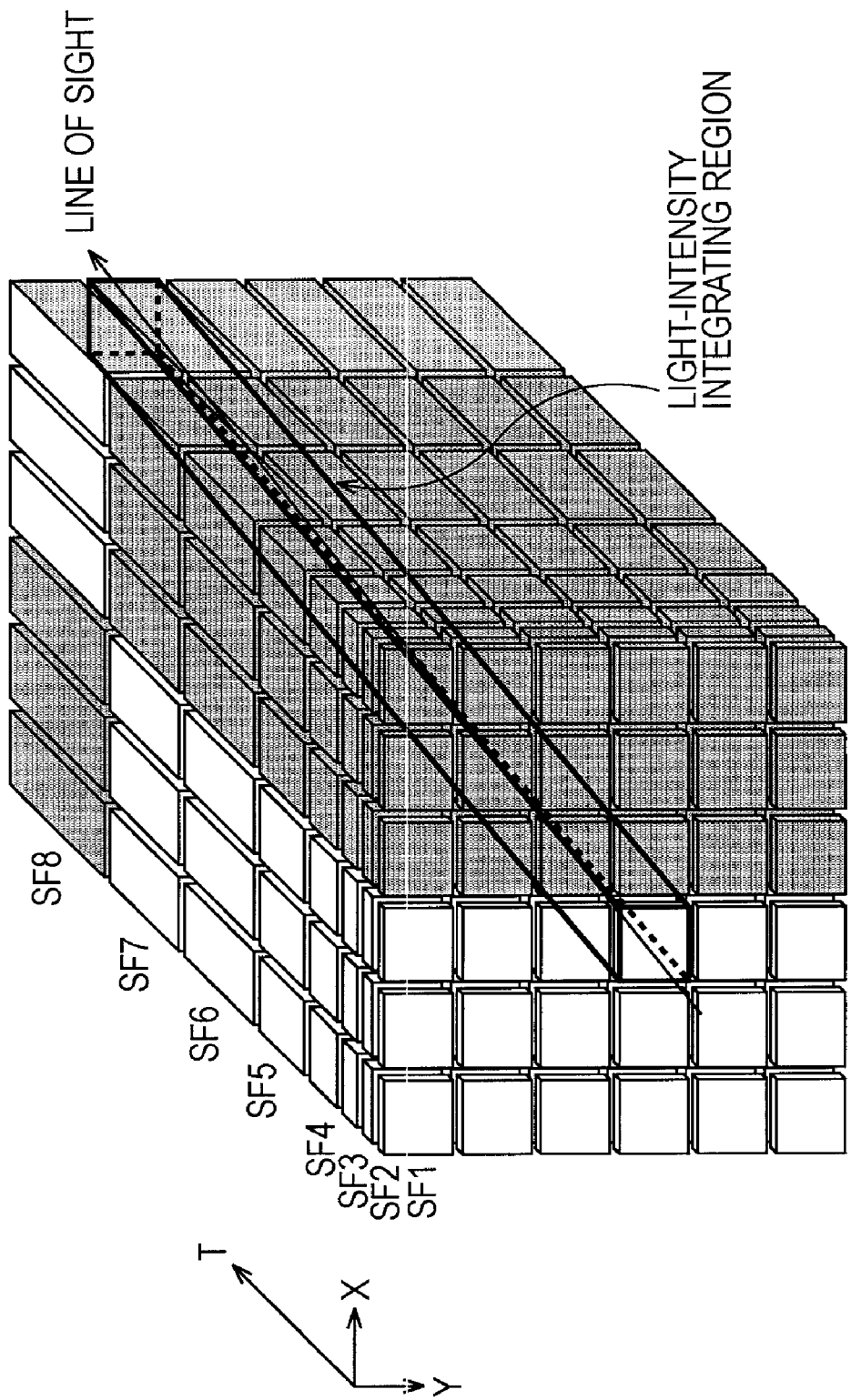
FIG. 11 is a diagram illustrating a light-intensity integrating region.

Since the actual PDP is configured on a two-dimensional plane, an image displayed on the PDP is represented by, as illustrated in FIG. 11, a three-dimensional model diagram including sub-fields having pixel positions X, Y in the PDP and being in the time direction T.

As above, the image processing device illustrated in FIG. 1 generates, from the input image signal Vin, on the basis of the line-of-sight direction for each pixel and the light emitting pattern of the sub-fields at the time of displaying on the PDP, an image having, as a pixel value, the light intensity integrated on the retinas of a person seeing an image displayed on the PDP as an image seen by the eyes of the person who sees the image displayed on the PDP. Therefore, an image that is represented by the input image signal Vin displayed on the PDP, and seen by a person can be reproduced in a simulated manner.

Figure 12:
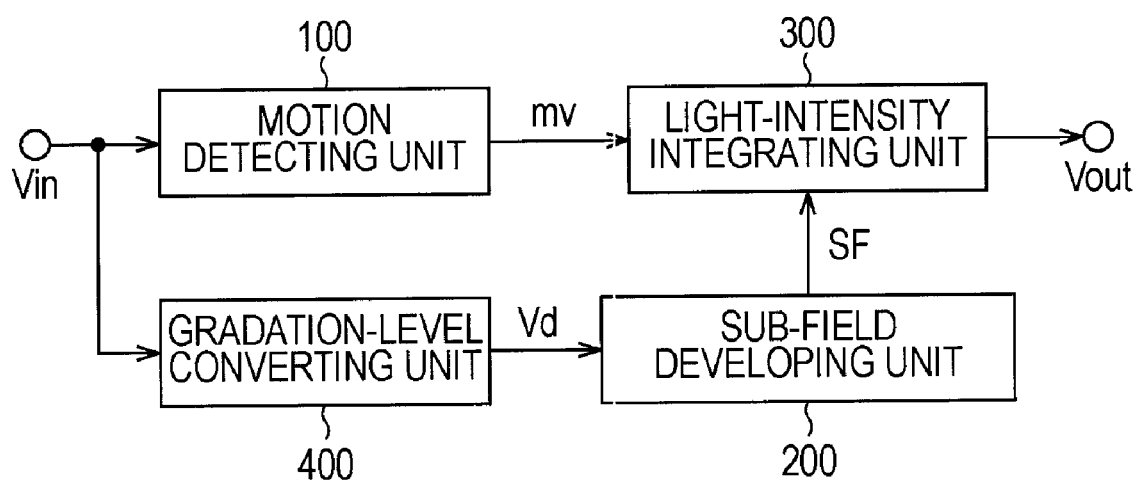
FIG. 12 is a block diagram illustrating a structure example of a second embodiment of an image processing device to which the present invention is applied.

FIG. 12 illustrates a structure example of a second embodiment of an image processing device to which the present invention is applied.

In general, in order to suppress a moving-image false contour in a PDP, usable gradation levels are limited. Furthermore, in order to realize apparent gradation levels, an error diffusing process of allocating a difference in pixel value between an input image and an image to be displayed to temporarily and spatially peripheral pixels, a dithering process of representing apparent gradation levels using a time-space pattern of a plurality of pixel values, and the like are performed. The image processing device illustrated in FIG. 12 reproduces, in a simulated manner, an image seen by the eyes of a person in the case where the above-described error diffusing process and dithering process are performed in a PDP that displays the input image signal Vin.

In FIG. 12, the input image signal Vin is supplied to the motion detecting unit 100 and the gradation-level converting unit 400. Since the structure of the motion detecting unit 100 is similar to that illustrated in FIG. 1, a description thereof is omitted.

Figure 13:
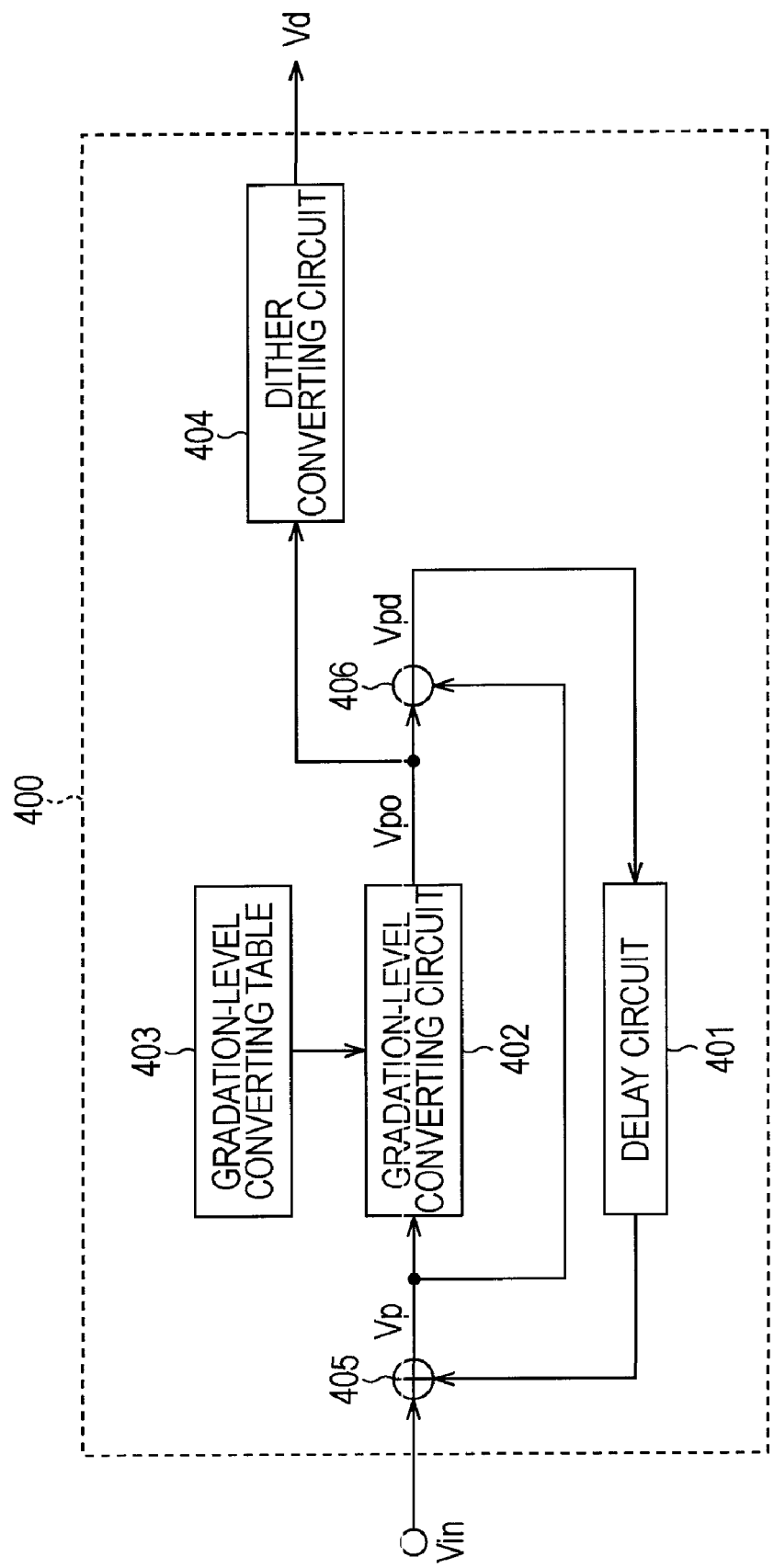
FIG. 13 is a block diagram illustrating a structure example of a gradation-level converting unit 400.

FIG. 13 illustrates a structure example of the gradation-level converting unit 400 in FIG. 12.

The input image signal Vin is added in a computing unit 405 with a display gradation-level error Vpd described later to produce a pixel value (gradation level) Vp, which is supplied to a gradation-level converting circuit 402.

The gradation-level converting circuit 402 converts the input pixel gradation level (pixel value) Vp to another gradation level Vpo in accordance with a gradation-level converting table 403. That is, when 0, 1, 3, 7, 15, 31, 63, 127, and 255 are to be used as gradation levels at which a moving-image false contour is less likely to be generated, the foregoing gradation levels to be used and apparent gradation levels (dither gradation levels) that are represented using a time-space distribution of the foregoing gradation levels to be used are set in the gradation-level converting table 403.

The gradation-level converting circuit 402 is configured to use only gradation levels that are set in the gradation-level converting table 403. The gradation-level converting circuit 402 replaces the input gradation level Vp with, among gradation levels in the gradation-level converting table 403, the gradation level Vpo having the smallest difference with the gradation level Vp, and outputs the gradation level Vpo. The gradation level Vpo which is an output of the gradation-level converting circuit 402 is supplied to the dither converting circuit 404. Additionally, a computing unit 406 obtains the difference between the gradation level Vpo and the gradation level Vp which is an input of the gradation-level converting circuit 402 to produce the display gradation-level error Vpd. A delay circuit 401 delays the display gradation-level error Vpd by one pixel in the horizontal direction, and the computing unit 405 adds the delayed display gradation-level error Vpd with the pixel value of the next input image signal Vin. As above, representation of the gradation-level difference, which is converted in the foregoing manner, using gradation levels of peripheral pixels is called an error diffusion process.

Figure 14:
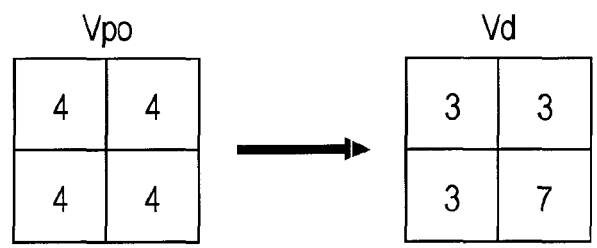
FIG. 14 is a diagram describing an operation of a dither converting circuit 404.

The dither converting circuit 404 performs a dither process (dither conversion) that represents apparent gradation levels using a time-space distribution of gradation levels to be used. An operation example of the dither converting circuit 404 is illustrated in FIG. 14. For example, when there is a region whose gradation level to be displayed is 4, the dither converting circuit 404 causes the gradation level to be distributed as illustrated in FIG. 14, for example, by using 3 and 7, which are gradation levels to be used. In this way, the values of the gradation levels are averaged, and the eyes of a person see the values of the gradation levels as 4.

Referring back to FIG. 12, as above, the gradation-level converting unit 400 converts the input image signal Vin to an image signal Vd that is actually used for display, and supplies the image signal Vd to the sub-field developing unit 200. Since the structures of the sub-field developing unit 200 and the light-intensity integrating unit 300 are similar to those illustrated in FIG. 1, descriptions thereof are omitted.

That is, in the image processing device in FIG. 12, the gradation-level converting unit 400 outputs an image seen by the eyes of a person as a simulated image on the basis of the actually displayed gradation levels. In this case, the motion detecting unit 100 detects (determines) the line of sight from the input image signal Vin. When the apparent gradation level obtained by conversion performed by the gradation-level converting unit 400 is not significantly different from the input image signal Vin, the line-of-sight direction is not significantly different either. Thus, the foregoing structure would have no problem. Also, the gradation-level converting unit 400 can be any unit as long as it converts the input image signal Vin to the image signal Vd used for display. For example, a method described in Japanese Unexamined Patent Application Publication No. 2004-138783 or the like may be used.

Figure 15:
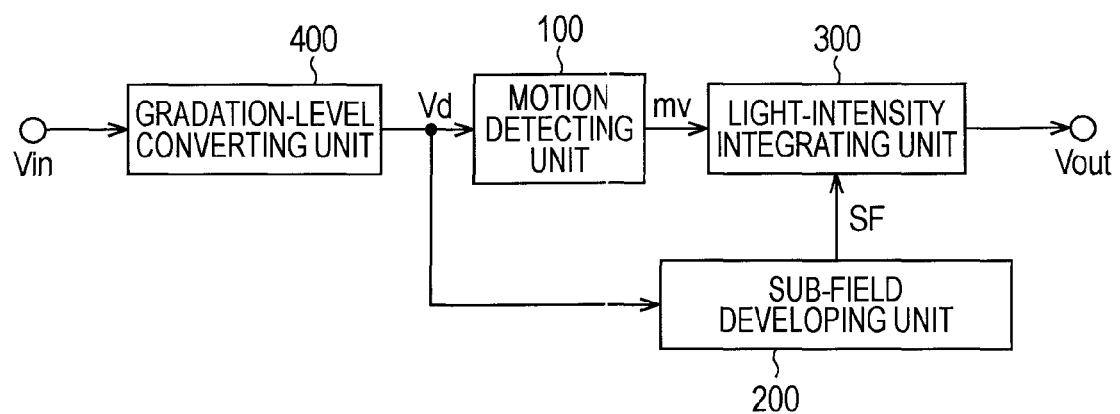
FIG. 15 is a block diagram illustrating a structure example of a third embodiment of an image processing device to which the present invention is applied.

FIG. 15 illustrates a structure example of a third embodiment of an image processing device to which the present invention is applied.

In this image processing device, the pixel (of the image signal) Vd, which is an output of the gradation-level converting unit 400, is supplied to the motion detecting unit 100. In this case, the motion detecting unit 100 is configured to detect the line of sight (line-of-sight direction) on the basis of the image signal to be actually displayed. Therefore, the line of sight in the case where limited gradation levels, diffused errors, and dither as is are visually detected is detected. Additionally, the gradation-level converting unit 400 can output an image seen by the eyes of a person as a simulated image on the basis of the actually displayed gradation levels.

Note that, in FIG. 15, since the structures of the motion detecting unit 100, the sub-field developing unit 200, the light-intensity integrating unit 300, and the gradation-level converting unit 400 are similar to those in FIG. 12, descriptions thereof are omitted.

Figure 16:
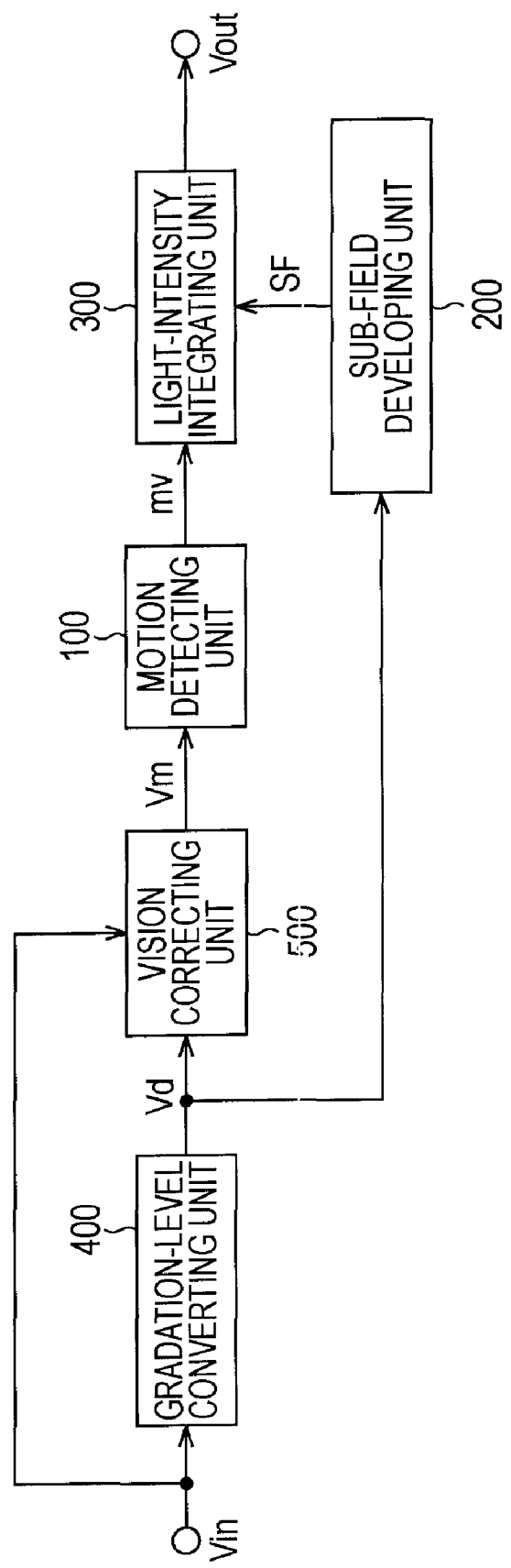
FIG. 16 is a block diagram illustrating a structure example of a fourth embodiment of an image processing device to which the present invention is applied.

FIG. 16 illustrates a structure example of a fourth embodiment of an image processing device to which the present invention is applied.

The input image signal Vin is supplied to the gradation-level converting unit 400 and converted to the image signal Vd used for display. The image signal Vd used for display is supplied to a vision correcting unit 500.

FIG. 17 illustrates a structure example of the vision correcting unit 500. The vision correcting unit 500 corrects the image signal Vd used for display to an apparent image (image signal) seen by a person in a simulated manner. The image signal Vd used for display is supplied to a dither correcting circuit 501. The dither correcting circuit 501 corrects gradation levels displayed as being dithered to apparent gradation levels in a simulated manner. That is, as illustrated in FIG. 14, when dither gradation levels are used, because the values of the gradation levels are averaged to the eyes of a person, the gradation levels are corrected as illustrated in FIG. 18. A dither-corrected image Vmb is supplied to a diffused-error correcting circuit 502.

The diffused-error correcting circuit 502 corrects an error diffused among peripheral pixels of a pixel of interest to an apparent gradation level in a simulated manner. That is, the diffused-error correcting circuit 502 regards that the difference (error) with the input image signal Vin has been diffused in the dither-corrected image signal Vmb, and corrects the diffused error. For example, as illustrated in FIG. 19, an error of a pixel whose image signal Vmb is 90 is a difference with the input image signal Vin at the right adjacent pixel whose image signal Vmb is 110, and 110−105=5 is added as a diffused error to the image signal Vmb, whereby a vision-corrected image signal Vm is output. Similarly, the same processing is performed on all pixels.

As above, the vision correcting unit 500 corrects gradation levels obtained by conversion performed by the gradation-level converting unit 400 to apparent gradation levels seen by the eyes of a person in a simulated manner, and supplies the corrected image signal to the motion detecting unit 100. Therefore, the line of sight is detected on the basis of a simulated image at the time limited gradation levels, diffused errors, and dither are seen by the eyes of a person. Additionally, the gradation-level converting unit 400 can obtain, in a simulated manner, an image seen by the eyes of a person on the basis of the actually displayed gradation levels. Note that, since the structures of the motion detecting unit 100, the sub-field developing unit 200, the light-intensity integrating unit 300, and the gradation-level converting unit 400 in FIG. 16 are similar to those in FIG. 12, descriptions thereof are omitted.

As above, the image processing devices in FIG. 1, FIG. 12, FIG. 15, and FIG. 16 can obtain an image seen by the eyes of a person in a simulated manner from the sub-field light emitting pattern and the line-of-sight direction at the time an image is displayed on a PDP. Therefore, an image seen by the eyes of a person at the time an arbitrary image signal is displayed on a PDP can be displayed in a simulated manner on a display device different from the PDP. That is, for example, a state in which, using a first display device such as an LCD, a CRT, an organic EL, or a projector, an image is displayed on a second display device having characteristics different from those of the first display device, such as a PDP, can be reproduced. A display emulation of the second display device can be performed using the first display device having characteristics different from those of the second display device.

Note that, although FIG. 6 is used as an example of the structure of sub-fields in the PDP, the number of sub-fields and the weight of luminance of each sub-field may be arbitrary.

Figure 20:
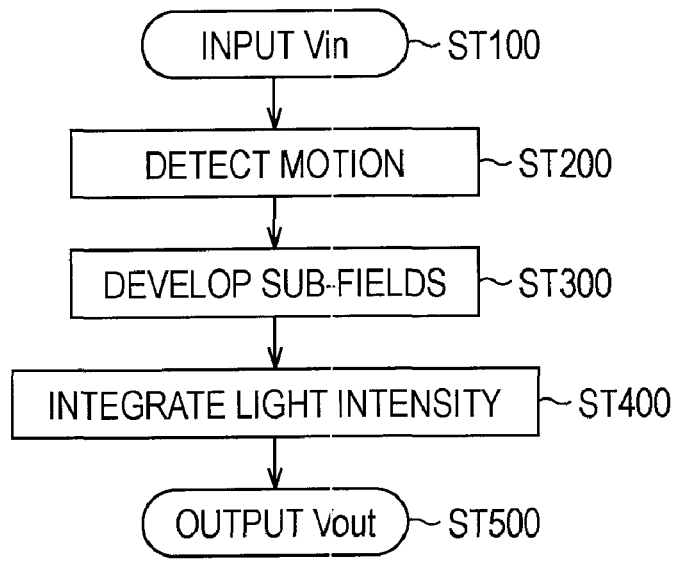
FIG. 20 is a flowchart illustrating an operation of the first embodiment of the image processing device to which the present invention is applied.

FIG. 20 illustrates a flowchart describing a process performed by the image processing device in FIG. 1.

In step ST100, the input image signal Vin is input to the image processing device. Next in step ST200, the motion detecting unit 100 sequentially regards a field (or frame) of the input image signal Vin as a field of interest, detects a motion vector for each pixel in the field of interest, and determines the direction of the motion vector as the line-of-sight direction.

Figure 21:
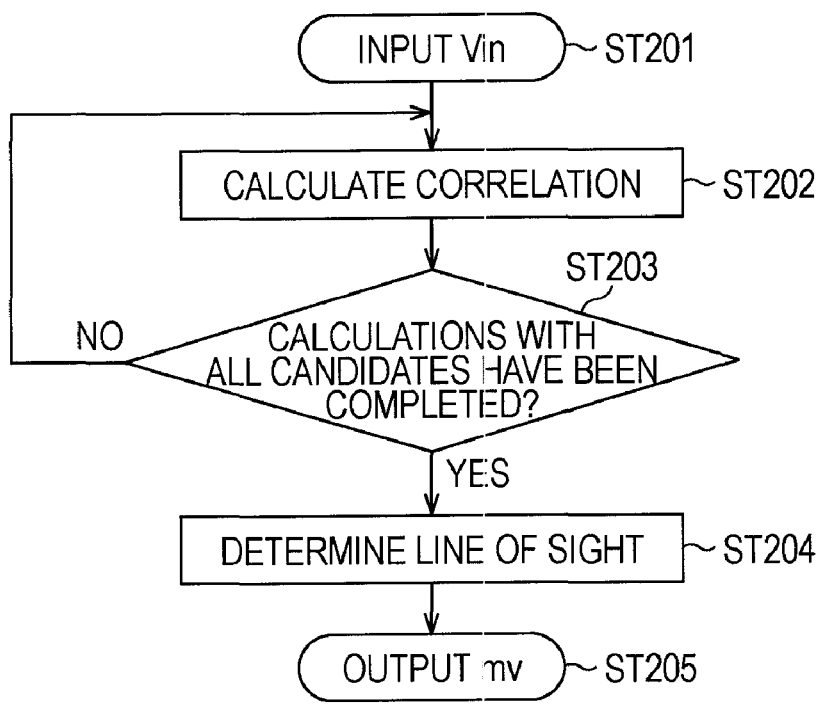
FIG. 21 is a flowchart describing a motion detecting process.

FIG. 21 is a flowchart describing a motion (vector) detecting process in step ST200.

In step ST201, the input image signal Vin of the field of interest is input to the motion detecting unit 100. Next in step ST202, the motion detecting unit 100 sequentially selects pixels constituting the field of interest as pixels of interest, and regards a block that surrounds each pixel of interest and has a predetermined size as a block of interest. The motion detecting unit 100 performs a correlation calculation between the block of interest in the field of interest and each of candidate blocks within a predetermined search range in a field prior to the field of interest.

Next in step ST203, the motion detecting unit 100 determines whether the calculations with all the candidate blocks have been completed. When the calculations have been completed, the process proceeds to step ST204. When the calculations have not been completed, the process returns to step ST202, and the process is continued. In step ST204, the motion detecting unit 100 detects the position of, among the candidate blocks, the candidate block having the highest correlation (candidate block having the smallest sum total of the absolute values of differences) as a motion vector, and determines the motion vector as a line-of-sight direction mv at the pixel of interest. In step ST205, the motion detecting unit 100 outputs the line-of-sight direction mv.

Referring back to FIG. 20, in the next step ST300, the sub-field developing unit 200 generates light-emission control information SF indicating the sub-field light emitting pattern at the time the field of interest of the input image signal Vin is displayed on a PDP.

Figure 22:
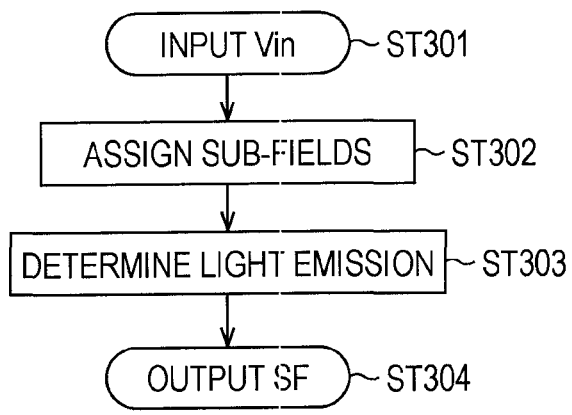
FIG. 22 is a flowchart describing a process of developing an image over sub-fields.

FIG. 22 is a flowchart of generating light-emission control information SF indicating the sub-field light emitting pattern in step ST300.

In step ST301, the field of interest of the input image signal Vin is input to the sub-field developing unit 200. Next in step ST302, the sub-field developing unit 200 represents the field of interest of the input image signal Vin using the sum total of weights of luminance of the individual sub-fields in equation (1) and obtains light-emission information Ni. Next in step ST303, the sub-field developing unit 200 generates, on the basis of the light-emission information Ni, light-emission control information SF indicating a light emitting pattern of light emission and no light emission in the individual sub-fields of the field of interest. In step ST304, the sub-field developing unit 200 outputs the light-emission control information SF indicating the sub-field light emitting pattern.

Referring back to FIG. 20, in the next step ST400, the light-intensity integrating unit 300 generates, in a simulated manner, an image signal Vout corresponding to the light intensity integrated on the retinas of a person (image seen by the eyes of the person), at the time the field of interest of the input image signal Vin is displayed on the PDP.

Figure 23:
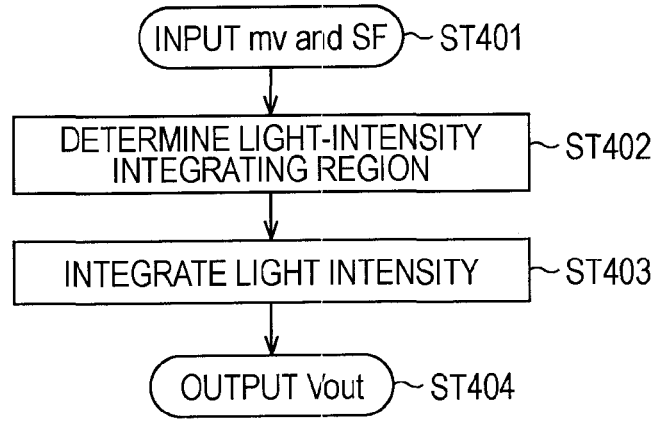
FIG. 23 is a flowchart describing a light-intensity integrating process.

FIG. 23 is a flowchart illustrating integration of the light intensity in step ST400.

In step ST401, the line-of-sight direction mv at each pixel in the field of interest, which is detected in step ST200, and the light-emission control information SF of the sub-fields of the field of interest, which is generated in step ST300, are input to the light-intensity integrating unit 300. Next in step ST402, the light-intensity integrating unit 300 sequentially selects individual pixels of the field of interest as pixels of interest and determines, on the basis of the line-of-sight direction mv at each pixel of interest, a light-intensity integrating region in which the light intensity is integrated. In step ST403, the light-intensity integrating unit 300 integrates the intensity of light emitted in sub-fields within the light-intensity integrating region determined in step ST402 on the basis of the light emitting pattern indicated by the light-emission control information SF, thereby obtaining a pixel value of the pixel of interest. The light-intensity integrating unit 300 generates an output image (signal) Vout constituted by the pixel value. In step ST404, the light-intensity integrating unit 300 outputs the output image Vout.

Referring back to FIG. 20, in the next step ST500, for example, an LCD serving as a second display device (not shown) displays the generated output image Vout.

Figure 24:
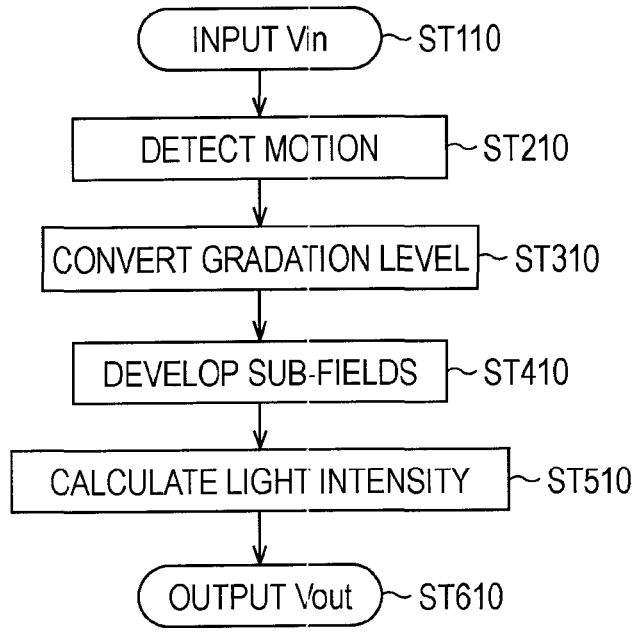
FIG. 24 is a flowchart illustrating an operation of the second embodiment of the image processing device to which the present invention is applied.

FIG. 24 illustrates a flowchart describing a process performed by the image processing device in FIG. 12.

In step ST110, as in step ST100 in FIG. 20, the input image signal Vin is input. Next in step ST210, a motion vector is detected for each pixel, and furthermore, the line-of-sight direction mv is detected for each pixel. The operation in step ST210 is similar to that in step ST200 in FIG. 20. Next in step ST310, the gradation-level converting unit 400 performs gradation-level conversion performed at the time of displaying using a PDP.

Figure 25:
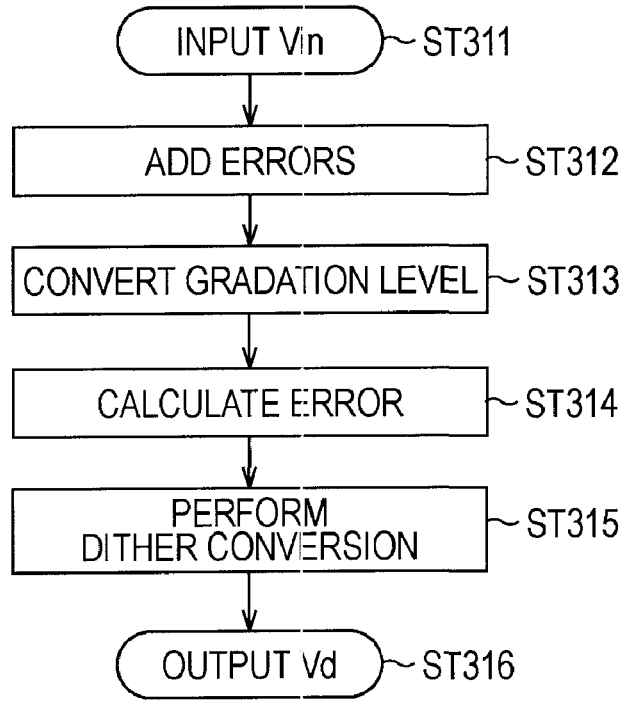
FIG. 25 is a flowchart describing a gradation-level converting process.

FIG. 25 is a flowchart illustrating the operation of gradation-level conversion in step ST310.

In step ST311, the input image signal Vin is input to the gradation-level converting unit 400. Next in step ST312, the gradation-level converting unit 400 converts the input image signal Vin to an image signal Vp by adding errors diffused from peripheral images. Next in step ST313, the gradation-level converting unit 400 converts the gradation level of the image signal Vp in accordance with the gradation-level converting table 403 (FIG. 13). Next in step ST314, the gradation-level converting unit 400 calculates an error (display gradation-level error) Vpd between the image signal Vp prior to gradation-level conversion and the image signal Vpo subsequent to gradation-level conversion.

Next in step ST315, the gradation-level converting unit 400 performs dither conversion of the image signal Vpo. In step ST316, the gradation-level converting unit 400 outputs an image signal obtained by performing dither conversion as a gradation-level-converted image signal Vd.

Referring back to FIG. 24, in the next step ST410, processing similar to that in step ST300 in FIG. 20 is performed on the image signal Vd obtained by conversion in step ST310. Also, since steps ST510 and ST610 thereafter are respectively similar to steps ST400 and ST500 in FIG. 20, descriptions thereof are omitted.

Figure 26:
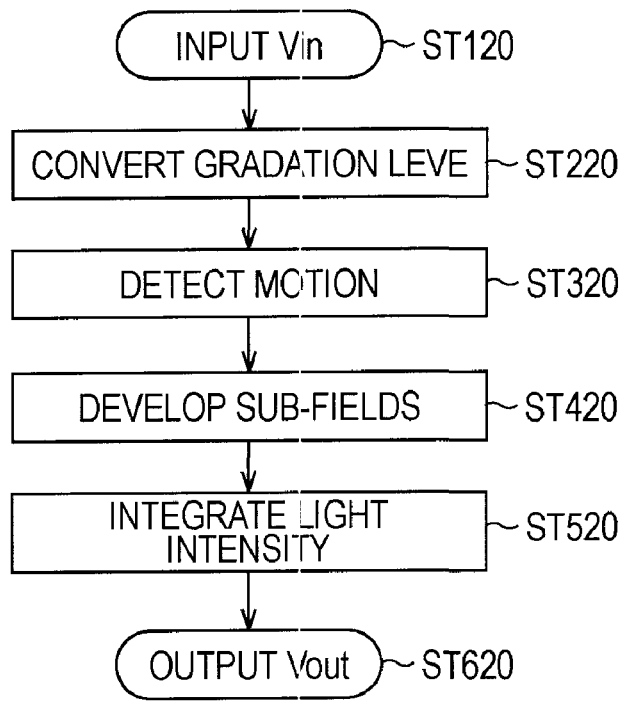
FIG. 26 is a flowchart illustrating an operation of the third embodiment of the image processing device to which the present invention is applied.

FIG. 26 illustrates a flowchart describing a process performed by the image processing device in FIG. 15.

Note that, in FIG. 26, besides the fact that, from the image signal Vd obtained by conversion in step ST220, the line-of-sight direction (motion vector) is detected in the next step ST320, processing similar to steps ST110, ST310, ST210, ST410, ST510, and ST610 in FIG. 24 is performed respectively in steps ST120, ST220, ST320, ST420, ST520, and ST620.

Figure 27:
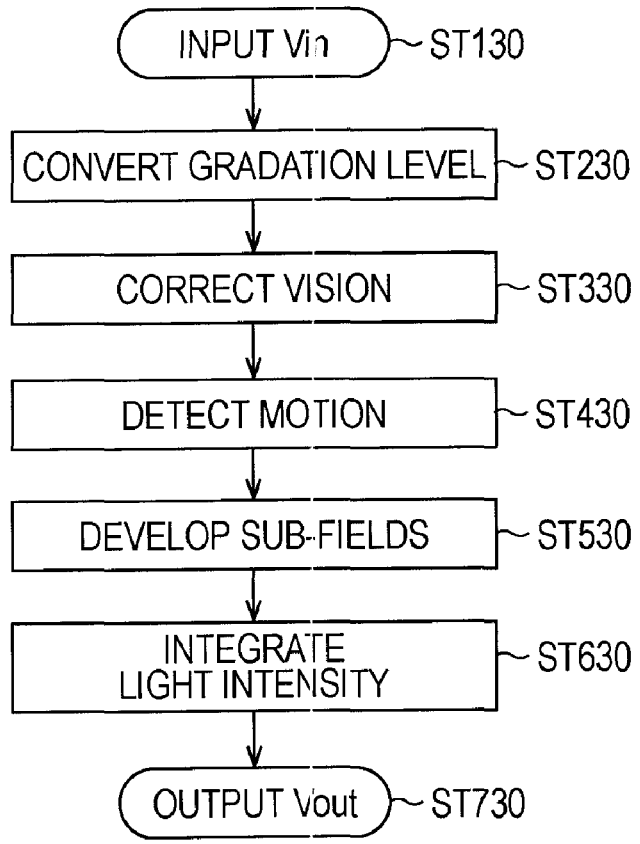
FIG. 27 is a flowchart illustrating an operation of the fourth embodiment of the image processing device to which the present invention is applied.

FIG. 27 illustrates a flowchart describing a process performed by the image processing device in FIG. 16.

In step ST130, as in step ST120 in FIG. 26, the input image signal Vin is input. Next in step ST230, as in the case of FIG. 26, a gradation-level-converted image signal Vd is generated. Next in step ST330, vision correction of the image signal Vd obtained by conversion in step ST320 is performed. Hereafter, processing similar to steps ST320, ST420, ST520, and ST620 in FIG. 26 is performed respectively in steps ST430, ST530, ST630, and ST730.

Figure 28:
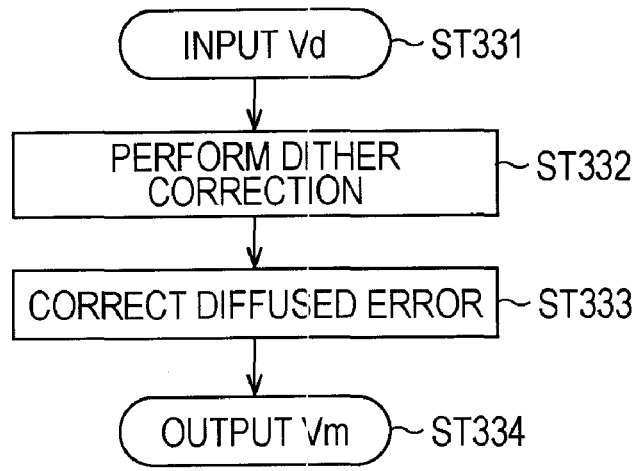
FIG. 28 is a flowchart describing a vision correcting process.

FIG. 28 is a flowchart illustrating the operation of vision correction in step ST330. In step ST331, the image signal Vd is input to the vision correcting unit 500. Next in step ST332, the vision correcting unit 500 corrects the image signal Vd in accordance with dithering visual effects. Next in step ST333, the vision correcting unit 500 performs correction for influences of errors diffused among peripheral pixels in a simulated manner and generates an image signal Vm. In step ST334, the vision correcting unit 500 outputs the image signal Vm.

As above, the image processing devices in FIG. 1, FIG. 12, FIG. 15, and FIG. 16 generate an image seen by the eyes of a person in a simulated manner from the sub-field light emitting pattern and the line-of-sight direction at the time an image is displayed on a PDP. Therefore, an image seen by the eyes of a person at the time an arbitrary image signal is displayed on a PDP can be displayed in a simulated manner on a display device different from the PDP.

Next, the details of a process performed by the light-intensity integrating unit 300 in FIG. 1 will be described. Before that, displaying an image on a PDP will be described again.

Displaying an image on a PDP is represented as a three-dimensional model diagram including sub-fields having pixel positions X, Y in the PDP and being in the time direction T, as illustrated in FIG. 7 and FIG. 11.

Figure 29:
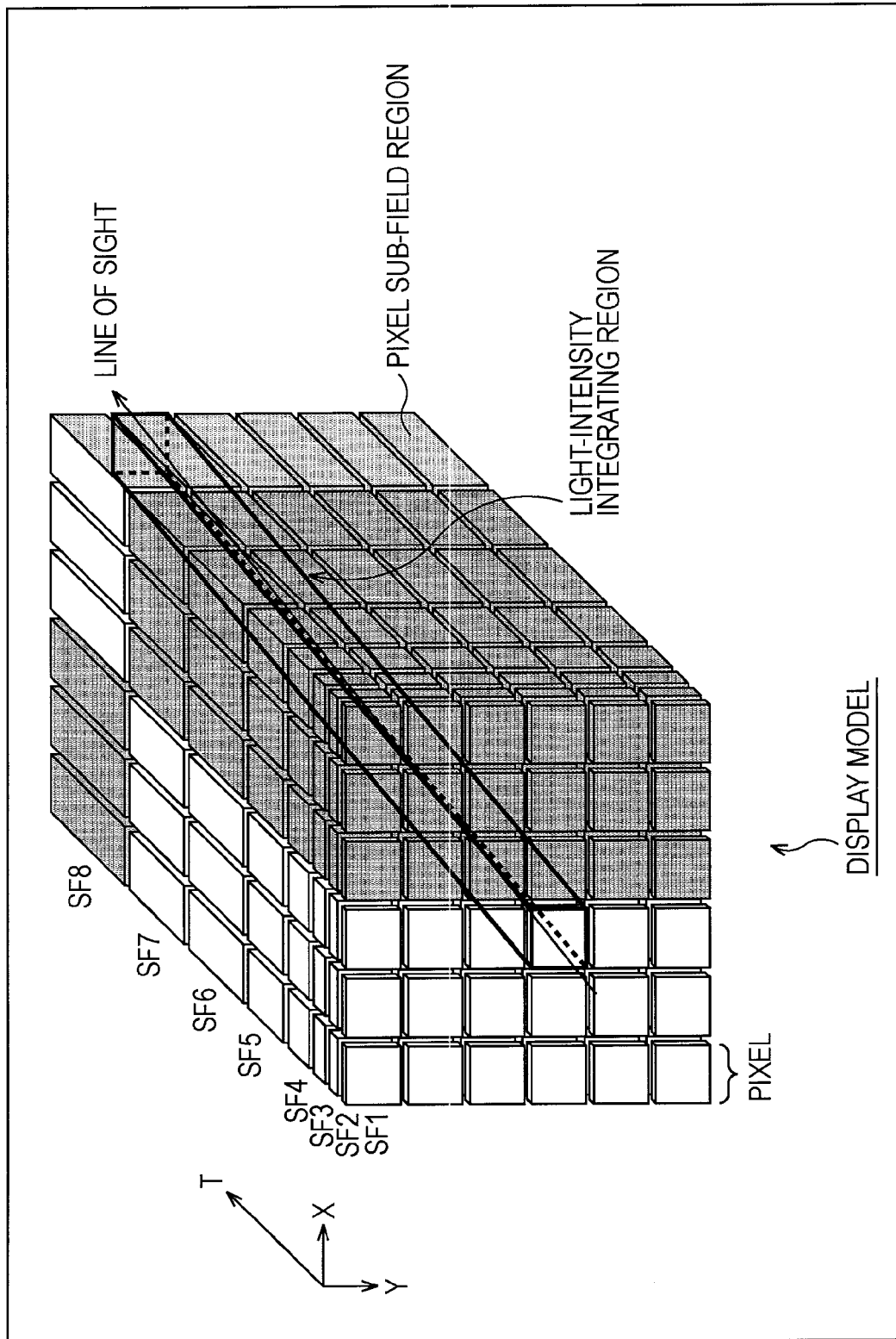
FIG. 29 is a diagram illustrating a display model.

FIG. 29 illustrates a model obtained by modeling displaying of an image on a PDP (hereinafter called a display model as needed).

Here, FIG. 29 is a diagram similar to FIG. 7 or FIG. 11 described above.

In the display model, eight sub-fields SF1 to SF8 are arranged in the direction of time T, which is a direction perpendicular to the XY plane serving as a display face that displays the input image signal Vin on the PDP.

Note that the XY plane serving as the display face has, for example, the upper-left point of the display face serving as the origin, the horizontal direction serving as the X direction, and the vertical direction serving as the Y direction.

The light-intensity integrating unit 300 (FIG. 1) sequentially selects pixels of the input image signal Vin displayed on the PDP (pixels of an image corresponding to the input image signal Vin, which is displayed on the PDP in accordance with the input image signal Vin) as pixels of interest. In the display model, a region that has a region of each pixel of interest as a cross section and extends in the line-of-sight direction mv at the pixel of interest (direction of the motion vector detected for the pixel of interest) serves as a light-intensity integrating region in which the light intensity is integrated. The light intensity within the light-intensity integrating region is integrated in accordance with the sub-field light emitting pattern indicated by the light-emission control information SF, whereby the pixel value of the pixel of interest is calculated.

That is, the light-intensity integrating unit 300 regards, as illustrated in FIG. 29, a rectangular prism region (space) that has a region of a pixel on the display face of the display model as a cross section and extends in the direction of time T for a length corresponding to the intensity of light emitted in the sub-field SF#i as a pixel sub-field region. By multiplying an occupancy ratio that is a ratio at which the light-intensity integrating region occupies the pixel sub-field region by the light intensity L of light emitted in accordance with the light emitting pattern of the sub-field SF#i corresponding to the pixel sub-field region (whether the pixel sub-field region in the sub-field SF#i emits light or does not emit light), the influential light intensity corresponding to the influence of the pixel sub-field region on the pixel value of the pixel of interest is obtained for all pixel sub-field regions through which the light-intensity integrating region passes.

The light-intensity integrating unit 300 integrates the influential light intensities, which are obtained for all the pixel sub-field regions through which the light-intensity integrating region passes, and calculates the integrated value as the pixel value of the pixel of interest.

Hereinafter, a method of calculating the pixel value of a pixel of interest using a display model, which is performed by the light-intensity integrating unit 300, will be described in detail.

Figure 30:
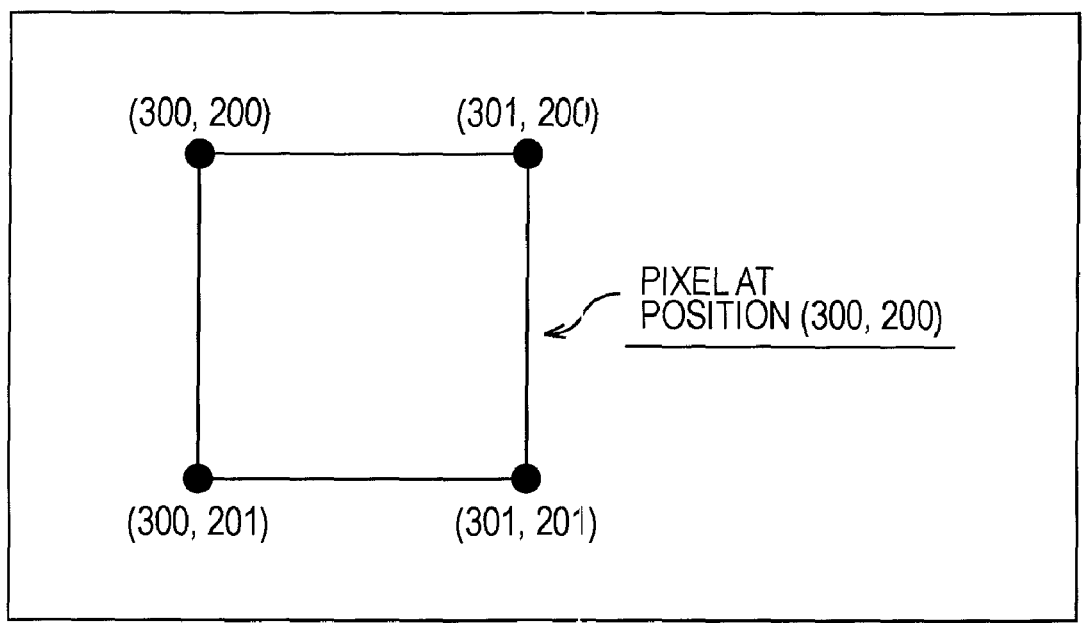
FIG. 30 is a diagram illustrating a pixel in the display model.

FIG. 30 illustrates an example of a pixel in the display model.

In the display model, a pixel is configured as a square region whose horizontal and vertical lengths are 1, for example. In this case, the area of the region of the pixel is 1 (=1×1).

Also, in the display model, the position of a pixel (pixel position) is represented using the coordinates of the upper left corner of the pixel. In this case, for example, in the case of a pixel (square region serving as a pixel) whose pixel position (X, Y) is (300, 200), as illustrated in FIG. 30, the coordinates of the upper-left point are (300, 200), and the coordinates of the upper-right point are (301, 200). Also, the coordinates of the lower-left point are (300, 201), and the coordinates of the lower-right point are (301, 201).

Note that, hereinafter, for example, the upper-left point of a pixel in the display model is called a reference point as needed.

Figure 31:
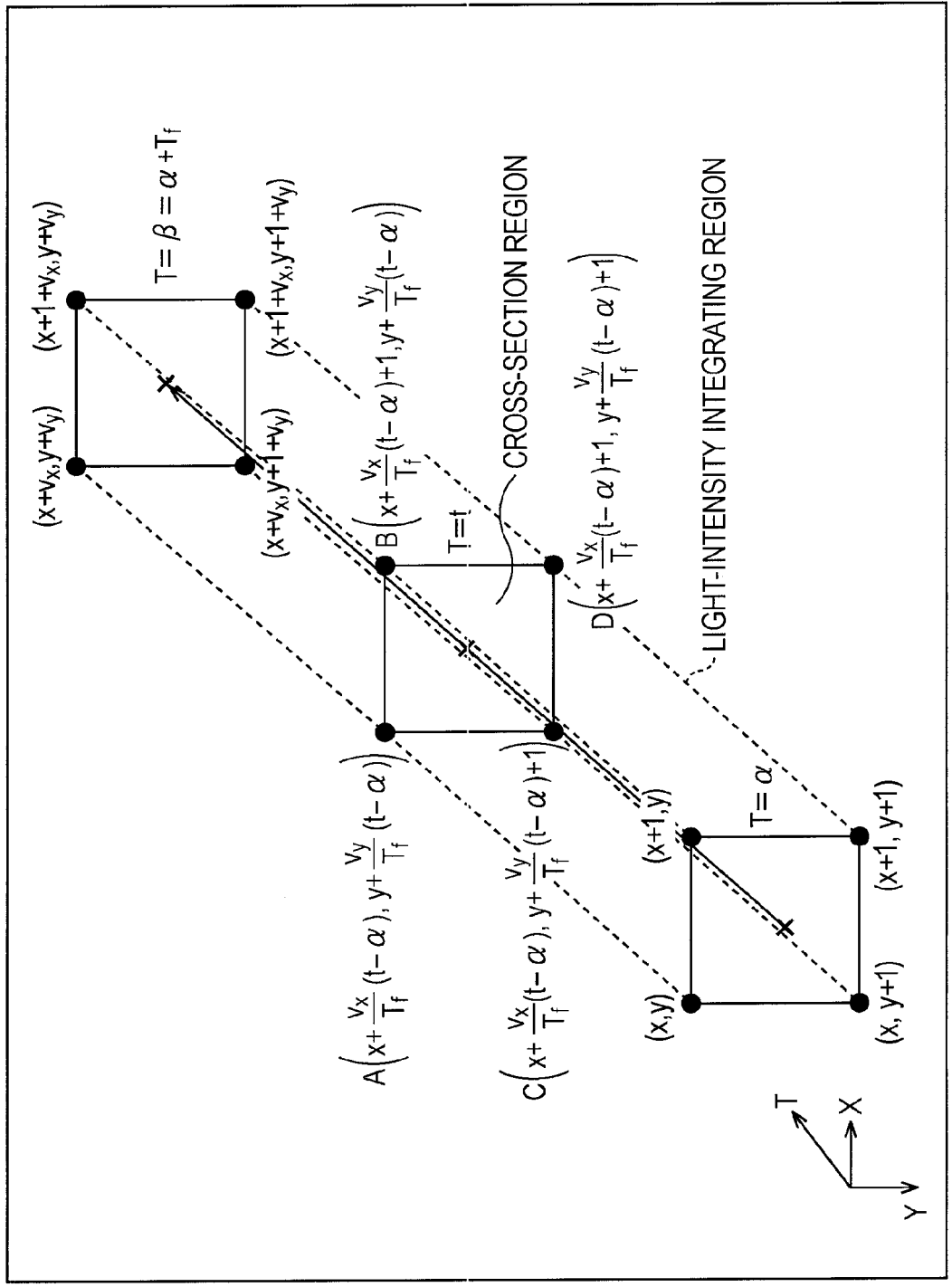
FIG. 31 is a diagram illustrating a light-intensity integrating region in the display model.

FIG. 31 illustrates a light-intensity integrating region in the display model.

For example, now, it is assumed that a pixel at a pixel position (x, y) serves as a pixel of interest. At time T=α, the pixel of interest (photographic subject reflected thereon) moves by a movement amount expressed as a motion vector $(v_x, v_y)$ within time $T_f$, and, at time $T=\beta(=\alpha+T_f)$, moves to a position $(x+v_x, y+v_y)$ In this case, the trajectory of a square region which serves as a region of the pixel of interest and moves from the position (x, y) to the position $(x+v_x, y+v_y)$ becomes a light-intensity integrating region (space).

Now, when it is assumed that the cross section of the light-intensity integrating region, that is, the region of the pixel of interest moving from the position (x, y) to the position $(x+v_x, y+v_y)$, is a cross-section region (plane), the cross-section region is a region having the same shape as the region of the pixel. Thus, the cross-section region has four vertices.

It is assumed that, among the four vertices of the cross-section region at an arbitrary time $T=t(\alpha \leq t \leq \beta)$ from time α to β, the upper-left, upper-right, lower-left, and lower-right points (vertices) are expressed as A, B, C, and D, respectively. Since the upper-left point A moves from the position (x, y) to the position $(x+v_x, y+v_y)$ within time $T_f$, the coordinates (X, Y) of the point A at time t become $(x+v_x(t-\alpha)/T_f, y+v_y(t-\alpha)/T_f)$.

Also, since the upper-right point B is a point at a distance of +1 from the point A in the X direction, the coordinates (X, Y) of the point B at time t become $(x+v_x(t-\alpha x)/T_f+1, y+v_y(t-\alpha)/T_f)$. Similarly, since the lower-left point C is a point at a distance of +1 from the point A in the Y direction, the coordinates (X, Y) of the point C at time t become $(x+v_x(t-\alpha)/T_f, y+v_y(t-\alpha)/T_f+1)$. Since the lower-right point D is a point at a distance of +1 from the point A in the X direction and at a distance of +1 from the point A in the Y direction, the coordinates (X, Y) of the point D at time t become $(x+v_x(t-\alpha)/T_f+1, y+v_y(t-\alpha)/T_f+1)$.

Figure 32:
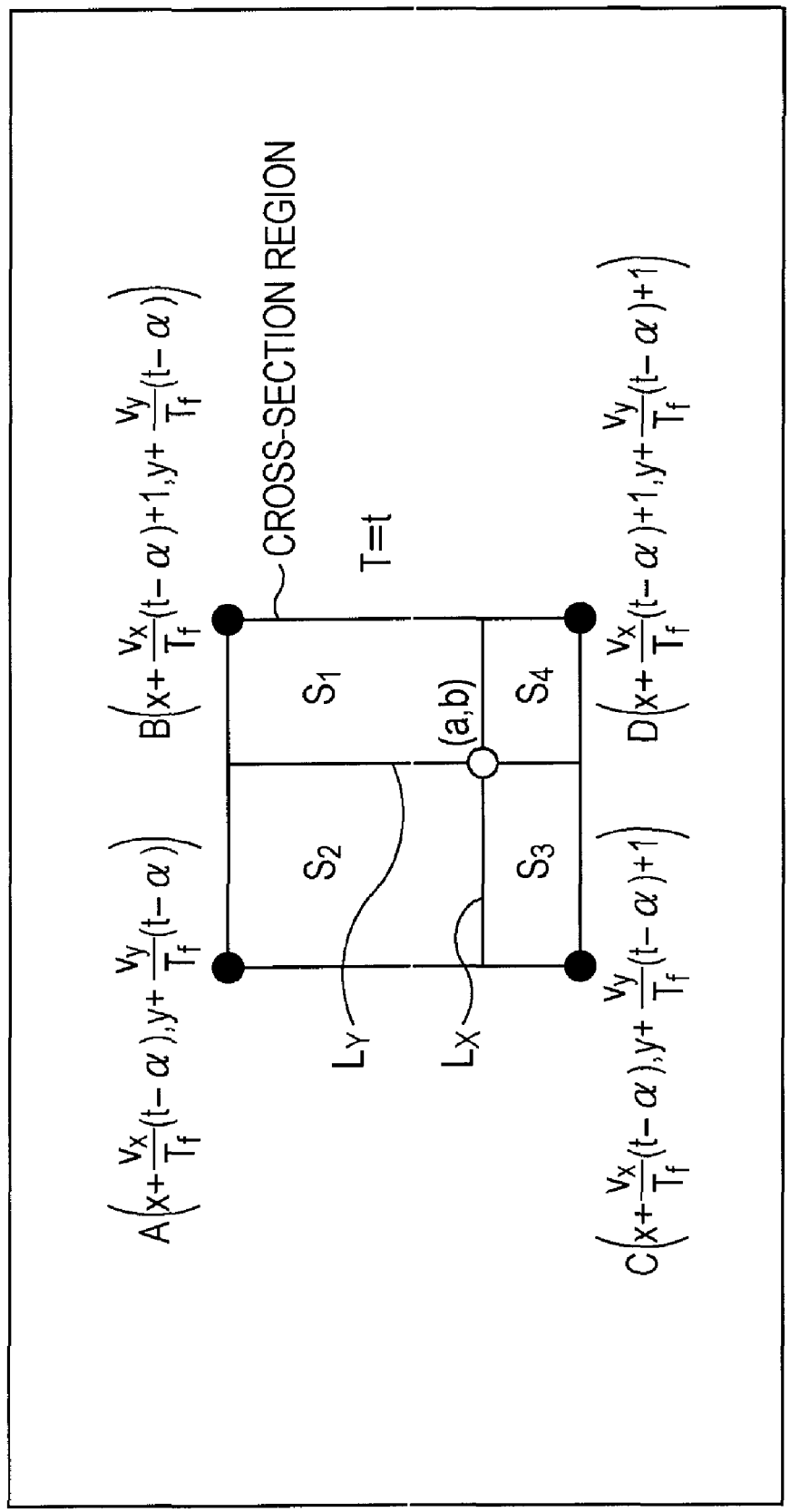
FIG. 32 is a diagram illustrating a cross-section region.

FIG. 32 illustrates the cross-section region at time T=t.

Since the cross-section region having the points A to D as vertices is not transformed, the cross-section region includes one or more reference points (when projected onto the XY plane) at an arbitrary time T=t. In FIG. 32, the cross-section region includes one reference point (a, b).

Here, the cross-section region may include a plurality of reference points. This case will be described later.

Also, the cross-section region moves as time T elapses. Accordingly, the position of the reference point within the cross-section region changes. This can be relatively regarded that, with reference to the cross-section region, the reference point moves as time T elapses. Because the reference point moves as time T elapses, the reference point within the cross-section region may be changed (to another reference point). This case will be described later.

In the cross-section region, a straight line $L_x$ that passes through the reference point (a, b) and is parallel to the X-axis and a straight line $L_y$ that passes through the reference point (a, b) and is parallel to the Y-axis become the boundary of pixels constituting the display model. Thus, integration of the light intensity is necessary to be performed in each region obtained by dividing the cross-section region using the straight lines $L_x$ and $L_y$ (hereinafter called divided regions).

In FIG. 32, the reference point (a, b) is in the interior of the cross-section region (portion other than the boundary), and accordingly, the cross-section region is divided into four divided regions $S_1$, $S_2$, $S_3$, and $S_4$. Note that, in FIG. 32, a region above and on the right of the reference point (a, b) is the divided region $S_1$; a region above and on the left of the reference point (a, b) is the divided region $S_2$; a region below and on the left of the reference point (a, b) is the divided region $S_3$; and a region below and on the right of the reference point (a, b) is the divided region $S_4$.

The area ($S_i$) of the divided region $S_i$ (i=1, 2, 3, 4) at time T=t is expressed using the following equations (1) to (4).

[Math. 1]
$$S_1 = \left|x + \frac{v_x}{T_f}(t-\alpha) + 1 - a\right| \cdot \left|y + \frac{v_y}{T_f}(t-\alpha) - b\right| \quad (1)$$

[Math. 2]
$$S_2 = \left|x + \frac{v_x}{T_f}(t-\alpha) - a\right| \cdot \left|y + \frac{v_y}{T_f}(t-\alpha) - b\right| \quad (2)$$

[Math. 3]
$$S_3 = \left|x + \frac{v_x}{T_f}(t-\alpha) - a\right| \cdot \left|y + \frac{v_y}{T_f}(t-\alpha) + 1 - b\right| \quad (3)$$

[Math. 4]
$$S_4 = \left|x + \frac{v_x}{T_f}(t-\alpha) + 1 - a\right| \cdot \left|y + \frac{v_y}{T_f}(t-\alpha) + 1 - b\right| \quad (4)$$

Now, it is assumed that, among the eight sub-fields SF1 to SF8 in the display model (FIG. 29), one sub-field SF#j serves as a sub-field of interest SF#j, and the cross-section region passes through the sub-field of interest SF#j from time T=$_{sfa}$ to time T=$_{sfb}$.

The light-intensity integrating region serving as the trajectory of the cross-section region passing through the sub-field of interest SF#j is equivalent to a combination of the trajectories of the individual divided regions $S_1$ to $S_4$ at the time the cross-section region passes therethrough.

Now, it is assumed that, within the light-intensity integrating region, a portion including the region serving as the trajectory of the divided region $S_i$ (solid body having the divided region $S_i$ as a cross section) is a divided solid body $V_i$. The volume ($V_i$) of the divided solid body $V_i$ can be obtained by integrating the divided region $S_i$ from time $t_{sfa}$ to $t_{sfb}$ in accordance with the following equations (5) to (8).

[Math. 5]
$$V_1 = \int_{t_{sfa}}^{t_{sfb}} S_1 dt \quad (5)$$

[Math. 6]
$$V_2 = \int_{t_{sfa}}^{t_{sfb}} S_2 dt \quad (6)$$

[Math. 7]
$$V_3 = \int_{t_{sfa}}^{t_{sfb}} S_3 dt \quad (7)$$

[Math. 8]
$$V_4 = \int_{t_{sfa}}^{t_{sfb}} S_4 dt \quad (8)$$

Note that, here, it is assumed that, when the cross-section region passes through the sub-field of interest SF#j, the reference point (a, b) is not changed (when the cross-section region starts passing through the sub-field of interest SF#j, the reference point (a, b) existed in the cross-section region continues existing in the cross-section region until the cross-section region passes through the sub-field of interest SF#j).

In contrast, in the display model, when it is assumed that, in the sub-field of interest SF#j, the volume of the pixel field region (FIG. 29) which is a solid body having the shape of a rectangular prism that has a region of the pixel as a cross section and extends in the direction of time T is V, the volume V of the pixel field region and the volume ($V_i$) of the divided solid bodies $V_1$, $V_2$, $V_3$, and $V_4$ has the relationship in equation (9).

[Math. 9]
$$V = \sum_{i=1}^{4} V_i \quad (9)$$

The divided solid body $V_i$, which is a portion of the light-intensity integrating region, occupies a portion of a certain pixel field region in the sub-field of interest SF#j. When the ratio of the divided solid body $V_i$ occupying the pixel field region serves as the occupancy ratio, the occupancy ratio is expressed as $V_i/V$ and can be obtained using equation (5) to equation (9).

Now, when it is assumed that the pixel field region, a portion of which is occupied by the divided solid body $V_i$, in the sub-field of interest SF#j is an occupied pixel field region, the light intensity corresponding to the influence of the occupied pixel field region (the light intensity therein) on the pixel value of the pixel of interest (hereinafter called the influential light intensity as needed) can be obtained by multiplying the occupancy ratio $V_i/V$ by the light intensity $SF_{Vi}$ in the occupied pixel field region.

Here, the light intensity $SF_{Vi}$ in the occupied pixel field region is the weight L of the luminance of the sub-field of interest SF#j when the occupied pixel field region in the sub-field of interest SF#j is emitting light. When the occupied pixel field region in the sub-field of interest SF#j is not emitting light (no light emission), the light intensity $SF_{Vi}$ is 0. Note that light emission/no light emission of the occupied pixel field region in the sub-field of interest SF#j can be recognized from the light emitting pattern indicated by the light-emission control information SF supplied from the sub-field developing unit 200 (FIG. 1) to the light-intensity integrating unit 300.

The light intensity $P_{SFL,j}$ corresponding to the influence of the sub-field of interest SF#j (the light intensity therein) on the pixel value of the pixel of interest (light intensity in the sub-field of interest SF#j) is the sum total of the influential light intensities $SF_{V1} \times V_1/V$, $SF_{V2} \times V_2/V$, $SF_{V3} \times V_3/V$, and $SF_{V4} \times V_4/V$ in the occupied pixel field region, portions of which are occupied by the divided solid bodies $V_1$, $V_2$, $V_3$, and $V_4$. Thus, the light intensity $P_{SFL,j}$ can be obtained from equation (10).

[Math. 10]
$$P_{SFL,j} = \sum_{i=1}^{4} \frac{V_i}{V} SF_{V_1} \quad (10)$$

The light-intensity integrating unit 300 (FIG. 1) obtains $P_{SFL,1}$ to $P_{SFL,8}$ in the eight sub-fields SF1 to SF8 for the pixel of interest in accordance with equation (10). The light-intensity integrating unit 300 integrates $P_{SFL,1}$ to $P_{SFL,8}$ in the eight sub-fields SF1 to SF8 and regards the integrated value $P_{SFL,1}+P_{SFL,2}+\ldots+P_{SFL,8}$ as the pixel value of the pixel of interest. Note that obtaining the integrated value $P_{SFL,1}+P_{SFL,2}+\ldots+P_{SFL,8}$ is equivalent to obtaining the influential light intensities in all pixel sub-field regions through which the light-intensity integrating region passes and integrating these influential light intensities.

Now, regarding the cross-section region which moves as time T elapses, as has been described above, a plurality of reference points may exist in the cross-section region, or a reference point in the cross-section region may be changed (to another reference point). These cases will be described with reference to FIG. 33 and FIG. 34.

Figure 33:
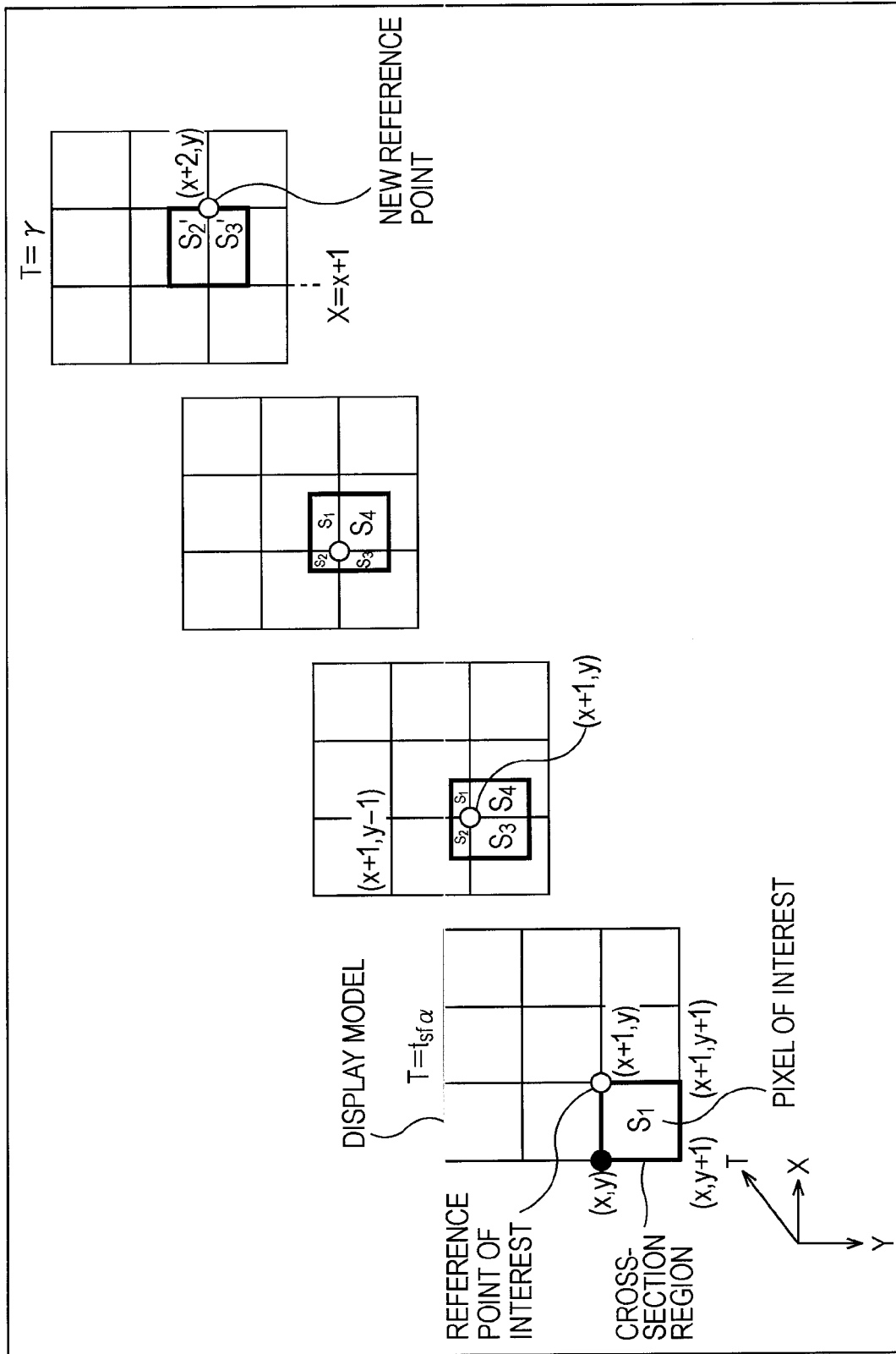
FIG. 33 is a diagram illustrating the cross-section region moving in the display model as time T elapses.
Figure 34:
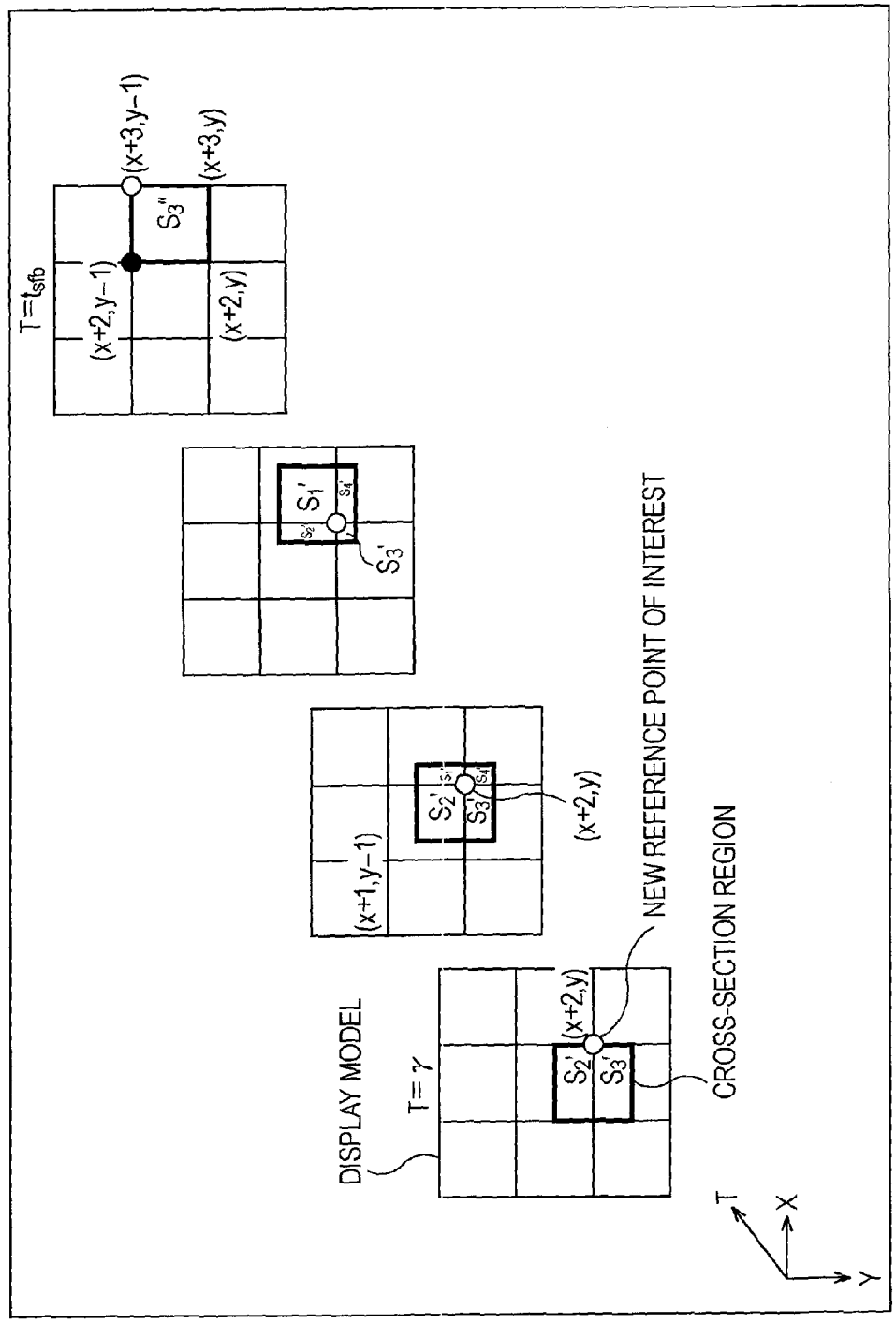
FIG. 34 is a diagram illustrating the cross-section region moving in the display model as time T elapses.

FIG. 33 and FIG. 34 illustrate a cross-section region that moves within the display model as time T elapses, with a pixel at the position (x, y) in the display model serving as a pixel of interest.

Note that FIG. 34 is a diagram continued from FIG. 34.

In FIG. 33 and FIG. 34, with the pixel at the pixel position (x, y) serving as the pixel of interest, the pixel of interest (photographic subject reflected thereon) moves, from time $T=t_{sfa}$ to time $T=T_{sfb}$, by a movement amount expressed as a motion vector (+2, −1) to the position (x+2, y−1).

As above, in the cross-section region which is a region of the pixel of interest which moves from the position (x, y) to the position (x+2, y−1), when the position of the cross-section region perfectly matches the position of a region of a pixel in the display model (when viewed from the XY plane), four vertices of the region of the pixel exist as reference points in the cross-section region.

That is, for example, in the cross-section region at the position (x, y) at which movement starts (cross-section region in which the position of the upper-left vertex is the position (x, y)), four reference points, namely, the point (x, y), the point (x+1, y), the point (x, y+1), and the point (x+1, y+1) exist.

As above, when there is a plurality of reference points in the cross-section region, for example, one reference point in the line-of-sight direction mv at the pixel of interest (direction of a motion vector detected for the pixel of interest) is selected as a reference point used to obtain the pixel value of the pixel of interest (hereinafter called a reference point of interest as needed).

That is, for example, when the X component of the motion vector representing the line-of-sight direction mv at the pixel of interest is greater than zero (sign is positive) and the Y component thereof is less than or equal to zero (Y component is zero or the sign thereof is negative), among the four vertices (x, y), (x+1, y), (x, y+1), and (x+1, y+1), the upper-right reference point (x+1, y) is selected as a reference point of interest.

Alternatively, for example, when the X component of the motion vector representing the line-of-sight direction mv at the pixel of interest is less than or equal to zero and the Y component thereof is less than or equal to zero, among the four vertices (x, y), (x+1, y), (x, y+1), and (x+1, y+1), the upper-left reference point (x, y) is selected as a reference point of interest.

Furthermore, for example, when the X component of the motion vector representing the line-of-sight direction mv at the pixel of interest is less than or equal to zero and the Y component thereof is greater than zero, among the four vertices (x, y), (x+1, y), (x, y+1), and (x+1, y+1), the lower-left reference point (x, y+1) is selected as a reference point of interest.

Alternatively, for example, when both the X component and the Y component of the motion vector representing the line-of-sight direction mv at the pixel of interest are greater than zero, among the four vertices (x, y), (x+1, y), (x, y+1), and (x+1, y+1), the lower-right reference point (x+1, y+1) is selected as a reference point of interest.

In FIG. 33, since the motion vector representing the line-of-sight direction mv at the pixel of interest is the vector (+2, −1), the upper-right reference point (x+1, y) is selected as a reference point of interest.

As above, after the reference point of interest (x+1, y) is selected, the cross-section region can be divided on the basis of the reference point of interest (x+1, y) into four divided regions $S_1$, $S_2$, $S_3$, and $S_4$, as described in FIG. 32. Therefore, the pixel value of the pixel of interest can be obtained in accordance with equation (1) to equation (10) unless the cross-section region moves in the line-of-sight direction mv and a new reference point is contained in the cross-section region.

In contrast, when the cross-section region moves in the line-of-sight direction mv and a new reference point is included in the cross-section region, for the new reference point, a new reference point of interest is re-selected in a similar manner as above, and accordingly, the reference point of interest is changed.

That is, for example, in FIG. 33, at time T=γ, the X coordinate x+1 of the position of the cross-section region matches the X coordinate x+1 of the position of the pixel in the display model, and accordingly, a new reference point (x+2, y) is included in the cross-section region.

In this case, for the new reference point (x+2, y), a new reference point of interest is re-selected. In the current case, since the reference point (x+2, y) is the only new reference point, the reference point (x+2, y) is selected as a new reference point of interest, and accordingly, the reference point of interest is changed from the reference point (x+1, y) to the reference point (x+2, y).

Note that, when the Y coordinate of the position of the cross-section region matches the Y coordinate of the position of the pixel in the display model, and accordingly, a new reference point is included in the cross-section region, as has been described above, the reference point of interest is changed.

FIG. 34 illustrates the cross-section region after the reference point of interest is changed, that is, after the new reference point of interest (x+2, y) is selected.

After the new reference point of interest is selected, the cross-section region can be divided on the basis of the new reference point of interest into four divided regions, as in the case described using FIG. 32. In FIG. 34, the cross-section region is divided into four divided regions $S_1'$, $S_2'$, $S_3'$, and $S_4'$.

After the new reference point of interest is selected, when the cross-section region moves in the line-of-sight direction mv and a new reference point is included in the cross-section region, for the new reference point, a new reference point of interest is re-selected in a similar manner as above, and accordingly, the reference point of interest is changed.

In FIG. 34, at time $T=t_{sfb}$, the X coordinate x+2 of the position of the cross-section region matches the X coordinate x+2 of the position (x+2, y−1) of the pixel in the display model, and additionally the Y coordinate y−1 of the position of the cross-section region matches the Y coordinate y−1 of the position (x+2, y−1) of the pixel in the display model. Accordingly, three new reference points (x+2, y−1), (x+3, y−1), and (x+3, y) are included in the cross-section region.

When the cross-section region moves thereafter, among the three new reference points (x+2, y−1), (x+3, y−1), and (x+3, y), a new reference point of interest is re-selected in the foregoing manner.

As above, by re-selecting (changing) the reference point of interest, the occupancy ratio at which the light-intensity integrating region occupies the occupied pixel field region (FIG. 29), that is, the ratio $V_\epsilon/V$ of the volume $(V_\epsilon)$ of a portion $V_\epsilon$ of the occupied pixel field region, which is occupied by the light-intensity integrating region (since this portion corresponds to the above-described divided solid body, this portion will be called a divided solid body portion as needed) to the volume (V) of the occupied pixel field region V can be obtained.

That is, for example, as illustrated in FIG. 33 and FIG. 34, when the cross-section region moves from the position (x, y) to the position (x+2, y−1) from time $T=t_{sfa}$ to time $T=t_{sfb}$ and passes through the sub-field of interest SF#j, if the reference point of interest is changed only once at time $T=\gamma$, the volume $(V_\epsilon)$ of the divided solid body portion $V_\epsilon$, which is occupied by the light-intensity integrating region, of the occupied pixel field region having, for example, a region of a pixel at the position (x+1, y−1) in the sub-field of interest SF#j as a cross section can be obtained using equation (11).

[Math. 11]

$$V_\epsilon = \int_{t_{sfa}}^{\gamma} S_1 dt + \int_{\gamma}^{t_{sfb}} S_2' dt \qquad (11)$$

Here, in equation (11), $S_1$ indicates the area of a divided region in the region of the pixel at the position (x+1, y−1), which is the cross section of the occupied pixel field region, from time $T=t_{sfa}$ at which the reference point (x+1, y) is the reference point of interest to time $T=\gamma$, as illustrated in FIG. 33. Also, $S_2'$ indicates the area of a divided region in the region of the pixel at the position (x+1, y−1), which is the cross section of the occupied pixel field region, from time $T=\gamma$ at which the reference point (x+2, y) is the reference point of interest to time $T=t_{sfb}$, as illustrated in FIG. 34.

As indicated in equation (11), the volume $(V_\epsilon)$ of the divided solid body portion $V_\epsilon$, which is occupied by the light-intensity integrating region, of the occupied pixel field region having the region of the pixel at a certain position (X, Y) in the sub-field of interest SF#j as a cross section can be obtained by integrating the area (areas $S_1$ and $S_2'$ in equation (11)) of a divided region in the region of the pixel, which is the cross section of the occupied pixel field region, while dividing the integration section into sections at a point at which the reference point of interest is changed (in equation (11), the section from time $T=t_{sfa}$ to time $T=\gamma$ and the section from time $T=\gamma$ to time $T=t_{sfb}$).

The occupancy ratio $V_\epsilon/V$ at which the light-intensity integrating region occupies the occupied pixel field region can be obtained by dividing the volume $(V_\epsilon)$ of the divided solid body portion $V_\epsilon$, which is occupied by the light-intensity integrating region, of the occupied pixel field region, by the volume (V) of the occupied pixel field region V.

After the occupancy ratio $V_\epsilon/V$ is obtained, as described in FIG. 31 and FIG. 32, the occupancy ratio $V_i/V$ is multiplied by the light intensity in the occupied pixel field region, thereby obtaining the light intensity (influential light intensity) corresponding to the influence of the occupied pixel field region (the light intensity therein) on the pixel value of the pixel of interest. The influential light intensities in all pixel sub-field regions through which the light-intensity integrating region passes are obtained, and the influential light intensities are integrated, whereby the pixel value of the pixel of interest can be obtained.

Next, as indicated in equation (11), in order to obtain the volume $(V_\epsilon)$ of the divided solid body portion $V_\epsilon$, which is occupied by the light-intensity integrating region, of the occupied pixel field region, the time at which the reference point of interest is changed (time $\gamma$ in equation (11)) (hereinafter called a change time as needed) is necessary.

A change of the reference point of interest occurs when the X coordinate of the position of the cross-section region matches the X coordinate of the position of a pixel in the display model or when the Y coordinate of the position of the cross-section region matches the Y coordinate y−1 of the position of a pixel in the display model. Therefore, the change time can be obtained in the following manner.

That is, for example, now, as illustrated above in FIG. 31, it is assumed that a pixel at a pixel position (x, y) serves as a pixel of interest. At time $T=\alpha$, the cross-section region at the position (x, y) moves by a movement amount expressed as a motion vector $(v_x, v_y)$ within time $T_f$, and, at time $T=\beta(=\alpha+T_f)$, moves to a position $(x+v_x, y+v_y)$.

In this case, a change time $T_{cx}$ at which the X coordinate of the position of the cross-section region matches the X coordinate of the position of the pixel in the display model is expressed by equation (12).

[Math. 12]

$$T_{cx} = \frac{T_f}{|v_x|} N \qquad (12)$$

$$N = 1, 2, \ldots, |v_x|$$

Here, it is assumed that the X component $v_x$ of the motion vector takes an integer value.

Also, a change time $T_{cy}$ at which the Y coordinate of the position of the cross-section region matches the Y coordinate of the position of the pixel in the display model is expressed by equation (13).

[Math. 13]

$$T_{cy} = \frac{T_f}{|v_y|} N \qquad (13)$$

$$N = 1, 2, \ldots, |v_y|$$

Here, it is assumed that the Y component $v_y$ of the motion vector takes an integer value.

Note that, when the X component $v_x$ of the motion vector is a value other than zero, every time the time T becomes the change time $T_{cx}$, which is obtained in accordance with equation (12), a point obtained by adding +1 or −1 to the X coordinate of the reference point, which was the immediately preceding reference point of interest, becomes a new reference point of interest (changed reference point). That is, when the X component $v_x$ of the motion vector is positive, a point obtained by adding +1 to the X coordinate of the reference point, which was the immediately preceding reference point of interest, becomes a new reference point of interest. When the X component $v_x$ of the motion vector is negative, a point obtained by adding −1 to the X coordinate of the reference point, which was the immediately preceding reference point of interest, becomes a new reference point of interest.

Similarly, when the Y component $v_y$ of the motion vector is a value other than zero, every time the time T becomes the change time $T_{cy}$, which is obtained in accordance with equation (13), a point obtained by adding +1 or −1 to the Y coordinate of the reference point, which was the immediately preceding reference point of interest, becomes a new reference point of interest. That is, when the Y component $v_y$ of the motion vector is positive, a point obtained by adding +1 to the Y coordinate of the reference point, which was the immediately preceding reference point of interest, becomes a new reference point of interest. When the Y component $v_y$ of the motion vector is negative, a point obtained by adding −1 to the Y coordinate of the reference point, which was the immediately preceding reference point of interest, becomes a new reference point of interest.

Note that, when the change times $T_{cx}$ and $T_{cy}$ are equal, a point obtained by adding +1 or −1 to both of the X coordinate and the Y coordinate of the reference point, which was the immediately preceding reference point of interest, becomes a new reference point of interest.

Here, in FIG. 33 and FIG. 34, at time $T=t_{sfa}$, the cross-section region at the position (x, y) moves by a movement amount expressed as a motion vector $(v_x, v_y)=(+2, -1)$ within time $T_f$, and, at time $T=t_{sfb}$ ($=t_{sfa}+T_f$), moves to a position (x+2, y−1).

In FIG. 33 and FIG. 34, time $T=\gamma$ is the change time $T_{cx}$ when the variable N in equation (12) is 1. In equation (12), when $T_f=t_{sfb}-t_{sfa}$, N=1, and $v_x=+2$, the change time $T_{cx}=\gamma$ can be obtained in accordance with the equation $(t_{sfb}-t_{sfa})\times 1/|+2|$.

Figure 35:
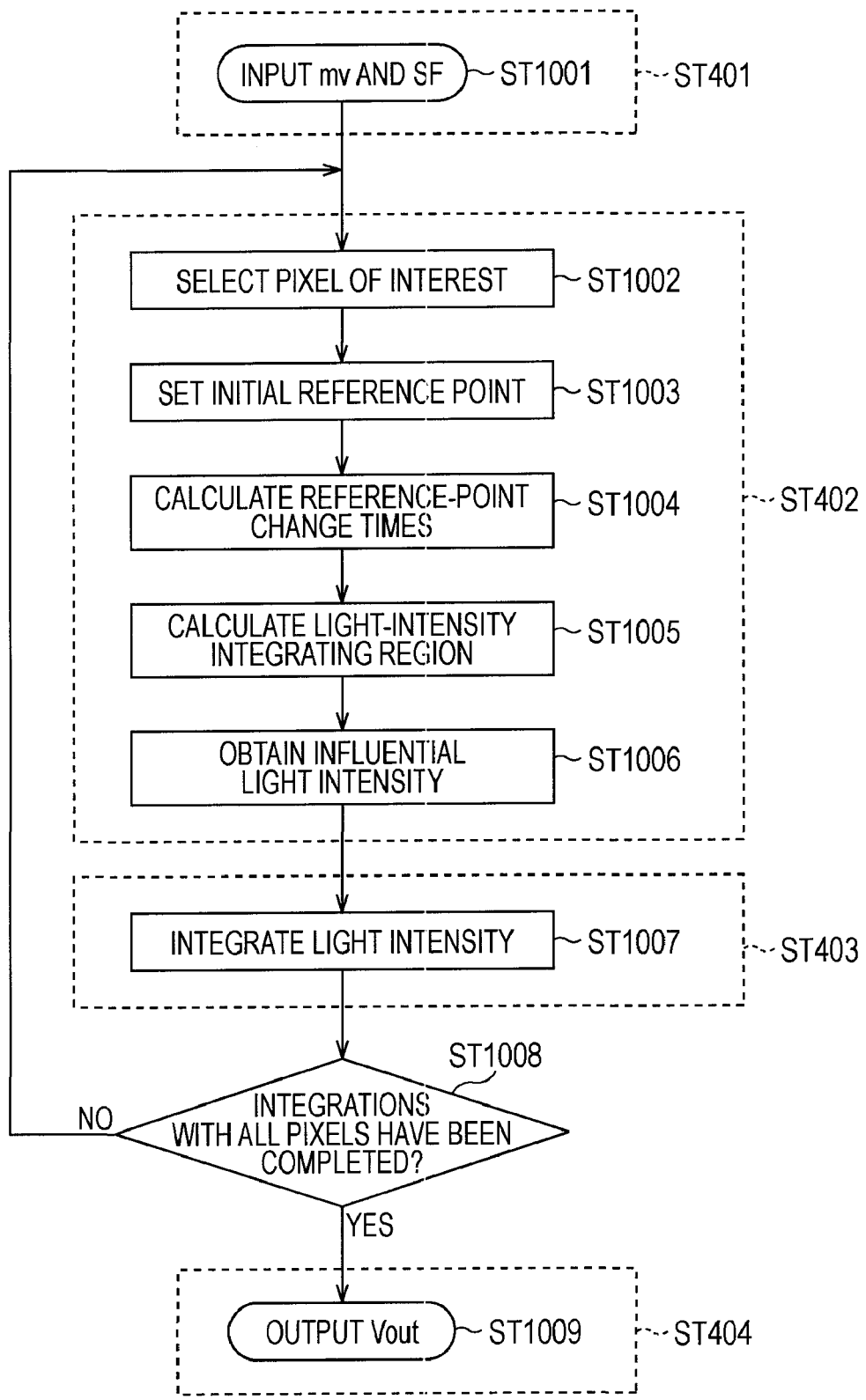
FIG. 35 is a flowchart describing a light-intensity integrating process.

Next, with reference to the flowchart in FIG. 35, the light-intensity integrating process in step ST400 in FIG. 20, which was described in FIG. 23, will be further described in detail.

In step ST1001, the line-of-sight direction mv at each pixel in the field of interest, which is detected in step ST200 in FIG. 20, is supplied from the motion detecting unit 100 (FIG. 1) to the light-intensity integrating unit 300. Additionally, the light-emission control information SF indicating the light emitting pattern of the sub-fields of the field of interest, which is generated in step ST300 in FIG. 20, is supplied from the sub-field developing unit 200 (FIG. 1) to the light-intensity integrating unit 300.

Here, step ST1001 corresponds to step ST401 in FIG. 23.

Thereafter, the process proceeds from step ST1001 to step ST1002, and, in the light-intensity integrating unit 300 (FIG. 8), the light-intensity-integrating-region determining circuit 301 selects, from among pixels constituting the field of interest, one of pixels that have not been selected as pixels of interest as a pixel of interest. The process proceeds to step ST1003.

In step ST1003, the light-intensity-integrating-region determining circuit 301 sets (selects), for the pixel of interest, a reference point that serves as an initial (first) reference point of interest among reference points in the display model on the basis of the line-of-sight direction mv at the pixel of interest. The process proceeds to step ST1004.

In step ST1004, the light-intensity-integrating-region determining circuit 301 obtains, for the pixel of interest, change times at which the reference point of interest is changed, as has been described in equations (12) and (13). Additionally, at each change time, the light-intensity-integrating-region determining circuit 301 obtains a reference point that serves as a new reference point of interest. The process proceeds to step ST1005.

In step ST1005, the light-intensity-integrating-region determining circuit 301 obtains a light-intensity integrating region using the line-of-sight direction mv at the pixel of interest, the change times obtained in step ST1004, and the reference point serving as a new reference point of interest at each change time.

That is, in step ST1005, the light-intensity-integrating-region determining circuit 301 obtains, for each of eight sub-fields SF1 to SF8, the volume ($V_i$) of a divided solid body potion $V_i$ (equation (10)), which is occupied by the light-intensity integrating region of the pixel of interest, of the occupied pixel field region, by using the line-of-sight direction mv at the pixel of interest, the change times, and the reference point serving as a new reference point of interest at each change time. Here, a region obtained by combining all the divided solid body portions $V_i$ obtained for the individual eight sub-fields SF1 to SF8 becomes a light-intensity integrating region.

In step ST1005, the light-intensity-integrating-region determining circuit 301 further obtains, for each of the eight sub-fields SF1 to SF8, the occupancy ratio $V_i/V$ at which the light-intensity integrating region of the pixel of interest occupies the occupied pixel field region. The process proceeds to step ST1006.

In step ST1006, the light-intensity-integrating-region determining circuit 301 obtains, for the individual eight sub-fields SF1 to SF8, light intensities (influential light intensities) $P_{SFL, 1}$ to $P_{SFL, 8}$ each corresponding to the influence of the occupied pixel field region (the light intensity therein) on the pixel value of the pixel of interest, by multiplying the occupancy ratio $V_i/V$, at which the light-intensity integrating region of the pixel of interest occupies the occupied pixel field region, by the light intensity $SF_{Vi}$ of the occupied pixel field region, as described in equation (10), and supplies the influential light intensities $P_{SFL, 1}$ to $P_{SFL, 8}$ to the light-intensity integrating circuit 302.

Note that the light intensity $SF_{Vi}$ in the occupied pixel field region in the sub-field SF#j is the weight L of the luminance of the sub-field SF#j when the sub-field SF#j is emitting light. When the sub-field SF#j is not emitting light (no light emission), the light intensity $SF_{Vi}$ is zero. The light-intensity-integrating-region determining circuit 301 recognizes light emission/no light emission of the sub-field SF#j from the light emitting pattern indicated by the light-emission control information SF supplied from the sub-field developing unit 200 (FIG. 1).

Here, the foregoing steps ST1002 to ST1006 correspond to step ST402 in FIG. 23.

Thereafter, the process proceeds from step ST1006 to step ST1007. The light-intensity integrating circuit 302 integrates the influential light intensities $P_{SFL, 1}$ to $P_{SFL, 8}$ from the light-intensity-integrating-region determining circuit 301, thereby obtaining the pixel value of the pixel of interest. The process proceeds to step ST1008.

Here, step ST1007 corresponds to step ST403 in FIG. 23.

In step ST1008, it is determined whether the light-intensity-integrating-region determining circuit 301 has selected all the pixels constituting the field of interest as pixels of interest.

When it is determined in step ST1008 that not all the pixels constituting the field of interest have been selected as pixels of interest, the process returns to step ST1002. The light-intensity-integrating-region determining circuit 301 selects, from among the pixels constituting the field of interest, one of the pixels which have not been selected as pixels of interest as a new pixel of interest. Thereafter, similar processing is repeated.

In contrast, when it is determined in step ST1008 that all the pixels constituting the field of interest have been selected as pixels of interest, the process proceeds to step ST1009. The light-intensity integrating circuit 302 outputs an output image Vout including pixel values obtained by selecting all the pixels constituting the field of interest as pixels of interest.

Here, step ST1009 corresponds to step ST404 in FIG. 23.

Figure 36:
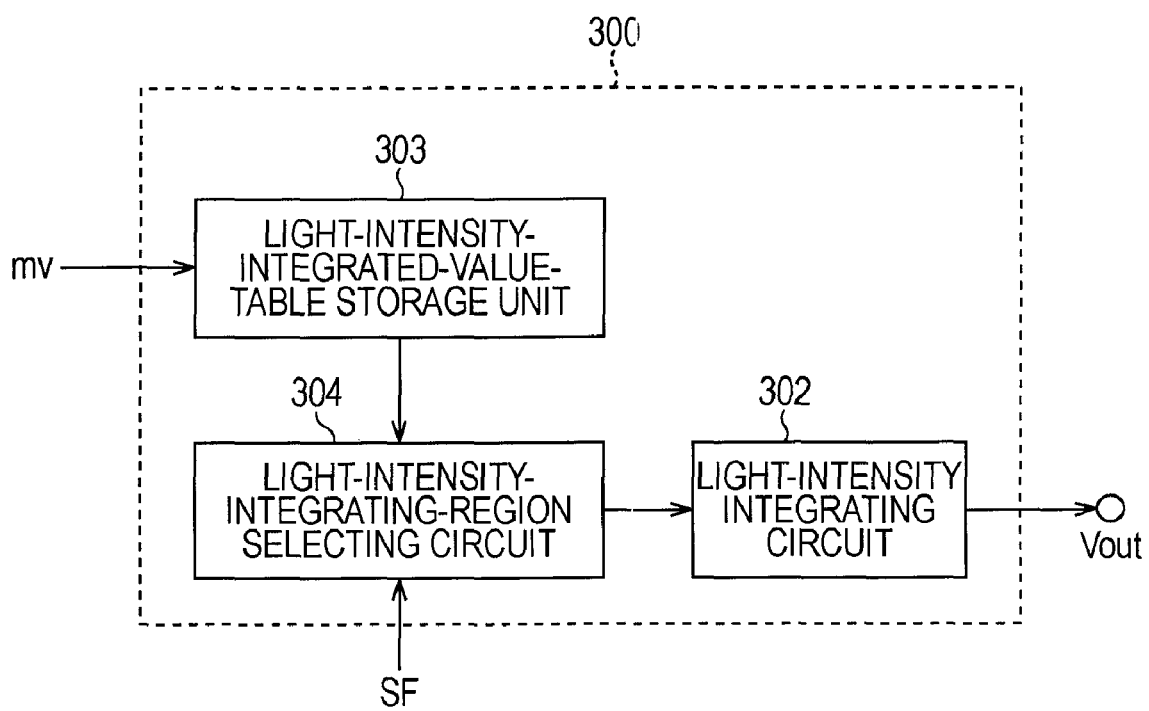
FIG. 36 is a block diagram illustrating another structure example of the light-intensity integrating unit 300.

Next, FIG. 36 illustrates another structure example of the light-intensity integrating unit 300 in FIG. 1.

Note that, in the drawing, portions corresponding to the case of FIG. 8 are given the same reference numerals, and descriptions thereof are appropriately omitted below.

That is, the light-intensity integrating unit 300 in FIG. 36 is common to the case of FIG. 8 since it includes the light-intensity integrating circuit 302. However, the light-intensity integrating unit 300 in FIG. 36 is different from the case of FIG. 8 since it includes, instead of the light-intensity-integrating-region determining circuit 301 in FIG. 8, a light-intensity-integrated-value-table storage unit 303 and a light-intensity-integrating-region selecting circuit 304.

The light-intensity integrating unit 300 in FIG. 36 obtains the occupancy ratio for the pixel of interest on the basis of the line-of-sight direction mv at the pixel of interest, by using a table in which the line-of-sight direction mv is correlated with an occupancy ratio (hereinafter called a light-intensity-integrated-value table as needed).

That is, in FIG. 36, the light-intensity-integrated-value-table storage unit 303 stores the light-intensity-integrated-value table.

The line-of-sight direction mv at each pixel in the field of interest is supplied from the motion detecting unit 100 (FIG. 1) to the light-intensity-integrated-value-table storage unit 303. The light-intensity-integrated-value-table storage unit 303 reads, from the light-intensity-integrated-value table, the occupancy ratio correlated with the line-of-sight direction mv at the pixel of interest, which is sequentially supplied thereto as a pixel of interest among pixels constituting the field of interest, as the occupancy ratio $V_i/V$ at which the light-intensity integrating region of the pixel of interest occupies the occupied pixel field region, and supplies the occupancy ratio $V_i/V$ to the light-intensity-integrating-region selecting circuit 304.

Besides the occupancy ratio which is supplied from the light-intensity-integrated-value-table storage unit 303, as has been described above, light-emission control information SF indicating a light emitting pattern of sub-fields of the field of interest is supplied from the sub-field developing unit 200 (FIG. 1) to the light-intensity-integrating-region selecting circuit 304.

The light-intensity-integrating-region selecting circuit 304 recognizes light emission/no light emission of the occupied pixel field region in the sub-field SF#j from the light emitting pattern indicated by the light-emission control information SF supplied from the sub-field developing unit 200. Furthermore, when the occupied pixel field region in the sub-field SF#j is emitting light, the light-intensity-integrating-region selecting circuit 304 sets the light intensity $SF_{Vi}$ in the occupied pixel field region to the weight L of the luminance of the sub-field SF#j. When the occupied pixel field region in the sub-field SF#j is not emitting light (no light emission), the light-intensity-integrating-region selecting circuit 304 sets the light intensity $SF_{Vi}$ in the occupied pixel field region to zero.

The light-intensity-integrating-region selecting circuit 304 obtains, for the individual eight sub-fields SF1 to SF8, the light intensities (influential light intensities) $P_{SFL, 1}$ to $P_{SFL, 8}$ each corresponding to the influence of the occupied pixel field region (the light intensity therein) on the pixel value of the pixel of interest, by multiplying the occupancy ratio $V_i/V$, at which the light-intensity integrating region of the pixel of interest occupies the occupied pixel field region, which is supplied from the light-intensity-integrated-value-table storage unit 303, by the light intensity $SF_{Vi}$ in the occupied pixel field region, as described in equation (10), and supplies the influential light intensities $P_{SFL, 1}$ to $P_{SFL, 8}$ to the light-intensity integrating circuit 302.

FIG. 37 schematically illustrates the light-intensity-integrated-value table stored in the light-intensity-integrated-value-table storage unit 303 in FIG. 36.

In the light-intensity-integrated-value table, the line-of-sight direction mv serving as a motion vector that can be detected by the motion detecting unit 100, and the occupancy ratio $V_i/V$, at which the light-intensity integrating region having the region of the pixel as a cross section occupies the occupied pixel field region, which is obtained in advance for each of the eight sub-fields SF1 to SF8 by calculations with the line-of-sight direction mv, are stored in a correlated manner.

That is, the light-intensity-integrated-value table is used for each line-of-sight direction mv. Therefore, when the search range of the motion vector serving as the line-of-sight direction mv is, for example, as will be described later, a 16×16-pixel range, and when the line-of-sight direction mv may take 256 possible directions, there are 256 light-intensity-integrated-value tables.

In the light-intensity-integrated-value table for one line-of-sight direction mv, the occupancy ratio $V_i/V$ for each of the eight sub-fields SF1 to SF8 is registered. Accordingly, the line-of-sight direction mv is correlated with the occupancy ratio $V_i/V$ for each of the eight sub-fields SF1 to SF8, which correspond to that line-of-sight direction mv.

FIG. 37 illustrates a light-intensity-integrated-value table for a certain line-of-sight direction mv.

The light-intensity-integrated-value table for one line-of-sight direction mv is a table in which, for example, a sub-field SF#j is plotted in abscissa, and a relative position [x, y] from a pixel of interest is plotted in ordinate.

Here, in the present embodiment, since there are eight sub-fields SF1 to SF8, spaces corresponding to the individual eight sub-fields SF1 to SF8 are provided in abscissa of the light-intensity-integrated-value table.

Also, the x coordinate and the y coordinate of the relative position [x, y] in ordinate of the light-intensity-integrated-value table represent the position in the X direction and the position in the Y direction, respectively, with reference to the position of the pixel of interest (origin). For example, the relative position [1, 0] represents the position of a pixel that is adjacent to and on the right of the pixel of interest. For example, the relative position [0, −1] represents the position of a pixel that is adjacent to and above the pixel of interest.

Now, when the search range of the motion vector serving as the line-of-sight direction mv is, for example, a 16×16-pixel range having −8 to +7 pixels in the X direction and the Y direction, with reference to the pixel of interest serving as the center, the moving light corresponding to the movement of the pixel of interest within one field may take 256 possible positions from [−8, −8] to [7, 7] with reference to the pixel of interest. Thus, spaces corresponding to the individual 256 possible relative positions [x, y] are provided in ordinate of the light-intensity-integrated-value table.

When the line-of-sight direction mv is expressed by a certain motion vector MV, in the light-intensity-integrated-value table corresponding to the line-of-sight direction MV, in the space defined by the column of a certain sub-field SF#j and the row at a certain relative position [x, y], the occupancy ratio $R_{SF\#j[x, y]}$ at which the light-intensity integrating region of the pixel of interest occupies the occupied pixel field region $B_{SF\#j[x, y]}$ in the sub-field SF#j, which has, as a cross section, the region of the pixel whose relative position from the pixel of interest is expressed as [x, y] ($V_i/V$ in equation (10)) or $V_\epsilon/V$ obtained by dividing $V_\epsilon$ in equation (11) by the volume (V) of the occupied pixel field region V) is obtained in advance by calculations and registered.

Note that, when the light-intensity integrating region of the pixel of interest does not pass through the occupied pixel field region $B_{SF\#j[x, y]}$ in the sub-field SF#j, which has, as a cross section, the region of the pixel whose relative position from the pixel of interest is expressed as [x, y] (when the occupied pixel field region $B_{SF\#j[x, y]}$ and the light-intensity integrating region of the pixel of interest do not overlap), the occupancy ratio $R_{SF\#j[x, y]}$ at which the light-intensity integrating region of the pixel of interest occupies the occupied pixel field region $B_{SF\#j[x, y]}$ is zero.

Here, when the line-of-sight direction mv at the pixel of interest is expressed as, for example, the motion vector (1, −1), the light-intensity integrating region of the pixel of interest passes only through, among occupied pixel field regions in the individual sub-fields SF1 to SF8, which have, as cross sections, individual regions of 256 pixels within the 16×16-pixel search range around the pixel of interest (256×8 occupied pixel field regions), eight occupied pixel field regions $B_{SF1[0, 0]}$ to $B_{SF8[0, 0]}$ in the individual sub-fields SF1 to SF8, which have the region of the pixel of interest as a cross section, eight occupied pixel field regions $B_{SF1[1, 0]}$ to $B_{SF8[1, 0]}$ in the individual sub-fields SF1 to SF8, which have the pixel on the right of the pixel of interest as a cross section, eight occupied pixel field regions $B_{SF1[0,−1]}$ to $B_{SF8[0, −1]}$ in the individual sub-fields SF1 to SF8, which have the pixel above the pixel of interest as a cross section, and eight occupied pixel field regions $B_{SF1[1, −1]}$ to $B_{SF8[1, −1]}$ in the individual sub-fields SF1 to SF8, which have the pixel that is above and on the right of the pixel of interest as a cross section, and does not pass through the other occupied pixel field regions.

Therefore, when, among the eight occupied pixel field regions $B_{SF1[0, 0]}$ to $B_{SF8[0, 0]}$ in the individual sub-fields SF1 to SF8, which have the region of the pixel of interest as a cross section, the volumes ($V_i$ in equation (5) to equation (9)) of portions (divided solid body portions) through which the light-intensity integrating region of the pixel of interest passes are expressed as $V_{SF1[0, 0]}$ to $V_{SF8[0, 0]}$; when, among the eight occupied pixel field regions $B_{SF1[1, 0]}$ to $B_{SF8[1, 0]}$ in the individual sub-fields SF1 to SF8, which have the pixel on the right of the pixel of interest as a cross section, the volumes of portions through which the light-intensity integrating region of the pixel of interest passes are expressed as $V_{SF1[1, 0]}$ to $V_{SF8[1, 0]}$; when, among the eight occupied pixel field regions $B_{SF1[0, 1]}$ to $B_{SF8[0, 1]}$ in the individual sub-fields SF1 to SF8, which have the pixel above the pixel of interest as a cross section, the volumes of portions through which the light-intensity integrating region of the pixel of interest passes are expressed as $V_{SF1[0, −1]}$ to $V_{SF8[0, −1]}$; and when, among the eight occupied pixel field regions $B_{SF1[1, −1]}$ to $B_{SF8[1, −1]}$ in the individual sub-fields SF1 to SF8, which have the pixel that is above and on the right of the pixel of interest as a cross section, the volumes of portions through which the light-intensity integrating region of the pixel of interest passes are expressed as $V_{SF1[1, −1]}$ to $V_{SF8[1, −1]}$, in the light-intensity-integrated-value table for the line-of-sight direction mv, in which the line-of-sight direction mv is expressed as the motion vector (1, −1), the occupancy ratios $R_{SF1[0, 0]}$ to $R_{SF8[0, 0]}$ are values $V_{SF1[0, 0]}/V$ to $V_{SF8[0, 0]}/V$; the occupancy ratios $R_{SF1[1, 0]}$ to $R_{SF8[1, 0]}$ are values $V_{SF1[1, 0]}/V$ to $V_{SF8[1, 0]}/V$; the occupancy ratios $R_{SF1[0, −1]}$ to $R_{SF8[0, −1]}$ are values $V_{SF1[0, −1]}/V$ to $V_{SF8[0, −1]}/V$; and the occupancy ratios $R_{SF1[1, −1]}$ to $R_{SF8[1, −1]}$ are values $V_{SF1[1, −1]}/V$ to $V_{SF8[1, −1]}/V$. The other occupancy ratios are all zero.

The light-intensity-integrated-value-table storage unit 303 (FIG. 36) reads a total of 8×256 possible occupancy ratios for the individual eight sub-fields SF1 to SF8 and for the individual 256 possible relative positions [−8, −8] to [7, 7], which are registered in the light-intensity-integrated-value table corresponding to the line-of-sight direction mv at the pixel of interest, and supplies the 8×256 possible occupancy ratios to the light-intensity-integrating-region selecting circuit 304.

The light-intensity-integrating-region selecting circuit 304 selects occupancy ratios whose values are other than zero from among the occupancy ratios from the light-intensity-integrated-value-table storage unit 303, and multiplies the occupancy ratios whose values are other than zero by the corresponding light quantities $SF_{Fi}$, thereby obtaining the influential light intensities.

Note that, here, the light-intensity-integrating-region selecting circuit 304 selects occupancy ratios whose values are other than zero from among the occupancy ratios from the light-intensity-integrated-value-table storage unit 303, and multiplies the occupancy ratios whose values are other than zero by the corresponding light quantities $SF_{Fi}$, thereby obtaining the influential light intensities. Since the influential light intensity obtained by multiplying an occupancy ratio whose value is zero by any light intensity $SF_{Fi}$ is zero, the light-intensity-integrating-region selecting circuit 304 can obtain the influential light intensities by multiplying the occupancy ratios from the light-intensity-integrated-value-table storage unit 303 by corresponding light intensities $SF_{Fi}$, without particularly selecting occupancy ratios whose values are other than zero from among the occupancy ratios from the light-intensity-integrated-value-table storage unit 303.

Figure 38:
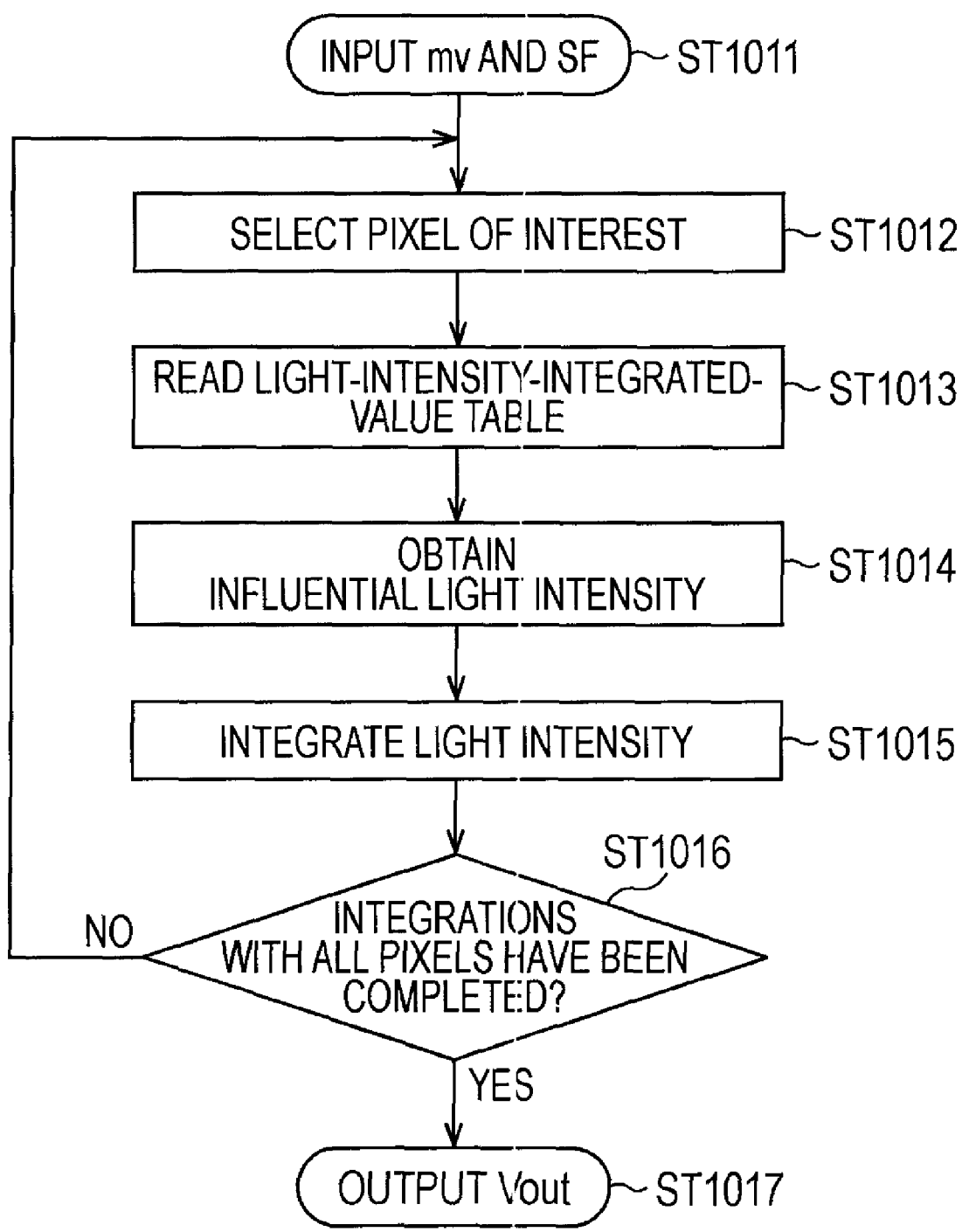
FIG. 38 is a flowchart describing a light-intensity integrating process.

Next, with reference to the flowchart in FIG. 38, the light-intensity integrating process performed by the light-intensity integrating unit 300 in FIG. 36 will be described in detail.

In step ST1011, the line-of-sight direction mv at each pixel in the field of interest is supplied from the motion detecting unit 100 (FIG. 1) to the light-intensity-integrated-value-table storage unit 303 in the light-intensity integrating unit 300. Additionally, light-emission control information SF indicating the light emitting pattern of sub-fields of the field of interest is supplied from the sub-field developing unit 200 (FIG. 1) to the light-intensity-integrating-region selecting circuit 304 in the light-intensity integrating unit 300.

Thereafter, the process proceeds from step ST1011 to step ST1012, and the light-intensity-integrated-value-table storage unit 303 selects, from among pixels constituting the field of interest, one of pixels that have not been selected as pixels of interest as a pixel of interest. The process proceeds to step ST1013.

In step S1013, the light-intensity-integrated-value-table storage unit 303 reads, from the light-intensity-integrated-value table corresponding to the line-of-sight direction mv at the pixel of interest, among line-of-sight directions mv from the motion detecting unit 100, all occupancy ratios $R_{SF\#j[x, y]}$ registered therein, and supplies the occupancy ratios $R_{SF\#j[x, y]}$ to the light-intensity-integrating-region selecting circuit 304. The process proceeds to step ST1014.

In step ST1014, the light-intensity-integrating-region selecting circuit 304 obtains the light intensity (influential light intensity) corresponding to the influence of the occupied pixel field region $B_{SF\#j[x, y]}$ (the light intensity therein) on the pixel value of the pixel of interest, by multiplying the occupancy ratio $R_{SF\#j[x, y]}$ from the light-intensity-integratedvalue-table storage unit 303 by the light intensity $SF_j$ in the corresponding occupied pixel field region $B_{SF\#j[x, y]}$, and supplies the obtained light intensity to the light-intensity integrating circuit 302.

Note that the light intensity $SF_j$ in the occupied pixel field region in the sub-field SF#j is the weight L of the luminance of the sub-field SF#j when the sub-field SF#j is emitting light. When the sub-field SF#j is not emitting light (no light emission), the light intensity $SF_j$ is zero. The light-intensity-integrating-region selecting circuit 304 recognizes light emission/no light emission of the sub-field SF#j from the light emitting pattern indicated by the light-emission control information SF supplied from the sub-field developing unit 200 (FIG. 1).

Thereafter, the process proceeds from step ST1014 to step ST1015. The light-intensity integrating circuit 302 integrates all the influential light intensities from the light-intensity-integrating-region determining circuit 304, thereby obtaining the pixel value of the pixel of interest. The process proceeds to step ST1016.

In step ST1016, it is determined whether the light-intensity-integrating-region selecting circuit 304 has selected all the pixels constituting the field of interest as pixels of interest.

When it is determined in step ST1016 that not all the pixels constituting the field of interest have been selected as pixels of interest, the process returns to step ST1012. The light-intensity-integrated-value-table storage unit 303 selects, from among the pixels constituting the field of interest, one of the pixels which have not been selected as pixels of interest as a new pixel of interest. Thereafter, similar processing is repeated.

In contrast, when it is determined in step ST1016 that all the pixels constituting the field of interest have been selected as pixels of interest, the process proceeds to step ST1017. The light-intensity integrating circuit 302 outputs an output image Vout including pixel values obtained by selecting all the pixels constituting the field of interest as pixels of interest.

Next, the above-described series of processes can be performed using dedicated hardware or software. When the series of processes is to be performed using software, a program constituting the software is installed in a general computer or the like.

Figure 39:
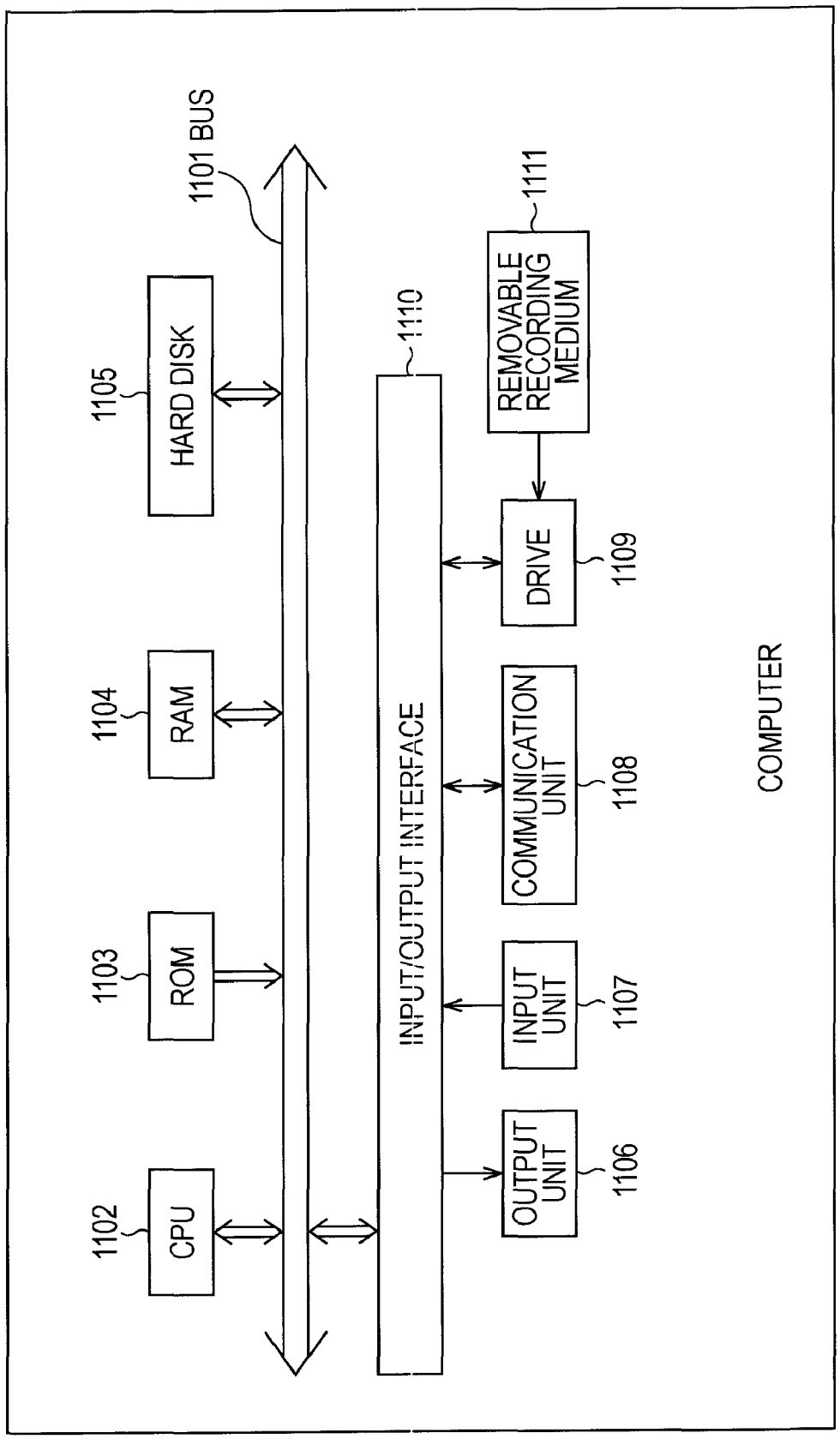
FIG. 39 is a block diagram illustrating a structure example of an embodiment of a computer to which the present invention is applied.

Therefore, FIG. 39 illustrates a structure example of an embodiment of a computer in which a program that executes the above-described series of processes is installed.

The program can be recorded in advance in a hard disk 1105 serving as a recording medium included in a computer, or a ROM 1103.

Alternatively, the program can be temporarily or permanently stored (recorded) on a removable recording medium 1111, such as a flexible disk, a CD-ROM (Compact Disc Read Only Memory), an MO (Magneto Optical) disk, a DVD (Digital Versatile Disc), a magnetic disk, or a semiconductor memory. The removable recording medium 1111 of this type may be provided as so-called packaged software.

Note that, other than installing the program in the computer from the above-described removable recording medium 1111, the program may be transferred to the computer from a download site by radio via a satellite for digital satellite broadcasting, or may be transferred to the computer by wire via a network such as a LAN (Local Area Network) or the Internet. In the computer, the program transferred in such a manner can be received by a communication unit 1108 and installed in the internal hard disk 1105.

The computer includes a CPU (Central Processing Unit) 1102. An input/output interface 1110 is connected via a bus 1101 to the CPU 1102. When a command is entered via the input/output interface 1110 from a user by, for example, operating an input unit 1107 including a keyboard, a mouse, a microphone, and the like, the CPU 1102 executes a program stored in the ROM (Read Only Memory) 1103 in response to the command. Alternatively, the CPU 1102 loads a program stored in the hard disk 1105, a program that is transferred from a satellite or a network, received by the communication unit 1108, and installed in the hard disk 1105, a program that is read from the removable recording medium 1111 mounted in a drive 1109 and installed in the hard disk 1105 into a RAM (Random Access Memory) 1104 and executes the program. Accordingly, the CPU 1102 performs processing in accordance with the above-described flowcharts or processing performed by the structures illustrated in the above-described block diagrams. If necessary, the CPU 1102 outputs the processing result via the input/output interface 1110 from an output unit 1106 implemented by an LCD (Liquid Crystal Display), a loudspeaker, or the like, or sends the processing result from the communication unit 1108. Furthermore, the CPU 1102 records the processing result in the hard disk 1105.

Here, in the description, the processing steps describing the program for the computer to perform various processes do not necessarily need to be performed in the time order of the flowcharts described above. The processing steps may include processes performed in parallel or individually (for example, by parallel processing or by object-oriented processing), for example.

Also, the program may be either operated with one computer or operated with multiple computers in a distributed manner. Furthermore, the program may be transferred to a remote computer so as to be executed in that computer.

Note that the embodiment of the present invention is not limited to the above-described embodiment, and various modifications can be made without departing from the gist of the present invention.

The invention claimed is:

1. An image processing device that reproduces a state in which, using a first display device that displays an image, the image is displayed on a second display device having a characteristic different from that of the first display device, comprising:
a motion detecting unit that detects motion of an image from an input image signal;
a sub-field developing unit that develops the input image signal over a plurality of sub-fields; and
a light-intensity integrating unit that
calculates, in a simulated manner, a light intensity integrated on retinas of a person at the time the person sees the input image signal displayed on the second display device, from a direction of the detected motion and a light emitting pattern of the developed sub-fields, and
generates an output image signal whose pixel value is the light intensity by
determining a light-intensity integrating region in which the light intensity is integrated for a pixel of interest,
regarding, as pixel sub-field regions, regions corresponding to the pixel of interest and having a length proportional to the light intensity of light emission in each of the sub-fields, and
obtaining, for all pixel sub-field regions through which the light-intensity integrating region passes, influential light intensities corresponding to influences of the pixel sub-field regions on the pixel of interest based on ratios at which the light-intensity integrating region occupies the pixel sub-field regions.

2. The image processing device according to claim 1, wherein the first display device is a display device other than a PDP (Plasma Display Panel).

3. The image processing device according to claim 1, wherein the first display device is a CRT (Cathode Ray Tube), an LCD (Liquid Crystal Display), an organic EL (Electroluminescence), or a projector.

4. The image processing device according to claim 1, wherein the second display device is a PDP (Plasma Display Panel).

5. The image processing device according to claim 1, wherein
the sub-field developing unit develops, on a pixel-by-pixel basis, the input image signal over a plurality of sub-fields in which light intensities of light emission are different, and
the light-intensity integrating unit regards, in the second display device, a direction perpendicular to a display face that displays the input image signal as a time direction, and, in a display model obtained by modeling displaying of the input image signal on the second display device in which the plurality of sub-fields are arranged in the time direction, a region that has a region of the pixel of interest to which attention is being paid, the region of the pixel of interest serving as a cross section, and extends in a direction of motion of the pixel of interest as the light-intensity integrating region in which the light intensity is integrated, and integrates the light intensity in the light-intensity integrating region in accordance with the light emitting pattern of the sub-fields, thereby calculating a pixel value of the pixel of interest.

6. The image processing device according to claim 5, wherein the light-intensity integrating unit calculates the pixel value of the pixel of interest by
regarding, in the display model, a region that has a region of a pixel on the display face as a cross section and extends in the time direction for the length corresponding to the light intensity of light emission in each of the sub-fields as the pixel sub-field region, and
multiplying an occupancy ratio that is a ratio at which the light-intensity integrating region occupies the pixel sub-field region by the light intensity of light emission in accordance with the light emitting pattern of the sub-field corresponding to the pixel sub-field region, thus obtaining, for all the pixel sub-field regions through which the light-intensity integrating region passes, the influential light intensities corresponding to the influences of the pixel sub-field regions on the pixel value of the pixel of interest; and
integrating the influential light intensities obtained for all the pixel sub-field regions through which the light-intensity integrating region passes.

7. The image processing device according to claim 6, wherein the light-intensity integrating unit obtains the occupancy ratio for the pixel of interest on the basis of the direction of the motion of the pixel of interest, by using a table in which a direction of motion of a pixel is correlated with the occupancy ratio.

8. The image processing device of claim 1, further comprising:
a gradation-level converting unit that converts input gradation-levels of the input image signal to converted gradation-levels according to a gradation-level converting table.

9. The image processing device of claim 8, wherein the input image signal of the sub-field developing unit has the converted gradation-levels.

10. The image processing device of claim 8, wherein the input image signal of the motion detecting unit has the converted gradation-levels.

11. The image processing device of claim 8, further comprising:
a vision correcting unit that corrects the converted gradation-levels to apparent gradation-levels seen by the eyes of the person in the simulated manner.

12. The image processing device of claim 11, wherein the vision correcting unit includes:
a dither correcting circuit that corrects the converted gradation-levels as being dithered to the apparent gradation-levels seen by the eyes of the person in the simulated manner; and
a diffused-error correcting circuit that corrects an error diffused among peripheral pixels of the pixel of interest to the apparent gradation-levels seen by the eyes of the person in the simulated manner.

13. The image processing device of claim 1, wherein the gradation-level converting unit includes:
a gradation-level converting circuit that replaces the input gradation-levels with converted gradation-levels within the gradation-level converting table and having the smallest difference with the input gradation-levels; and
a dither converting circuit that performs a dither conversion process using a time-space distribution of the converted gradation-levels.

14. An image processing method of reproducing a state in which, using a first display device that displays an image, the image is displayed on a second display device having a characteristic different from that of the first display device, the method comprising:
detecting motion of an image from an input image signal;
developing the input image signal over a plurality of sub-fields;
calculating, in a simulated manner, a light intensity integrated on retinas of a person at the time the person sees the input image signal displayed on the second display device, from a direction of the motion of the image and a light emitting pattern of the sub-fields; and
generating an output image signal whose pixel value is the light intensity by
determining a light-intensity integrating region in which the light intensity is integrated for a pixel of interest,
regarding, as pixel sub-field regions, regions corresponding to the pixel of interest and having a length proportional to the light intensity of light emission in each of the sub-fields, and
obtaining, for all pixel sub-field regions through which the light-intensity integrating region passes, influential light intensities corresponding to influences of the pixel sub-field regions on the pixel of interest based on ratios at which the light-intensity integrating region occupies the pixel sub-field regions.

15. A non-transitory computer readable medium having computer readable instructions thereon that when executed by a computer cause the computer to perform a method via an image processing device that reproduces a state in which, using a first display device that displays an image, the image is displayed on a second display device having a characteristic different from that of the first display device, the method comprising:

detecting motion of an image from an input image signal;
developing the input image signal over a plurality of sub-fields;
calculating, in a simulated manner, a light intensity integrated on retinas of a person at the time the person sees the input image signal displayed on the second display device, from a direction of the detected motion and a light emitting pattern of the sub-fields; and
generating an output image signal whose pixel value is the light intensity by
  determining a light-intensity integrating region in which the light intensity is integrated for a pixel of interest, regarding, as pixel sub-field regions, regions corresponding to the pixel of interest and having a length proportional to the light intensity of light emission in each of the sub-fields, and
  obtaining, for all pixel sub-field regions through which the light-intensity integrating region passes, influential light intensities corresponding to influences of the pixel sub-field regions on the pixel of interest based on ratios at which the light-intensity integrating region occupies the pixel sub-field regions.

* * * * *